United States Patent
Jeong et al.

(10) Patent No.: US 9,930,650 B2
(45) Date of Patent: Mar. 27, 2018

(54) METHOD AND APPARATUS FOR CONTROLLING SPECIFIC SERVICE IN NETWORK CONGESTION STATE IN WIRELESS COMMUNICATION SYSTEM

(71) Applicant: Samsung Electronics Co., Ltd., Gyeonggi-do (KR)

(72) Inventors: Sang Soo Jeong, Gyeonggi-do (KR); Song Yean Cho, Seoul (KR); Han Na Lim, Seoul (KR); Jin Uk Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 14/428,331

(22) PCT Filed: Sep. 16, 2013

(86) PCT No.: PCT/KR2013/008354
§ 371 (c)(1),
(2) Date: Mar. 13, 2015

(87) PCT Pub. No.: WO2014/042482
PCT Pub. Date: Mar. 20, 2014

(65) Prior Publication Data
US 2015/0230199 A1    Aug. 13, 2015

(30) Foreign Application Priority Data

Sep. 14, 2012 (KR) .......... 10-2012-0102035
Dec. 21, 2012 (KR) .......... 10-2012-0150620
Mar. 14, 2013 (KR) .......... 10-2013-0027235

(51) Int. Cl.
*H04W 72/04* (2009.01)
*H04W 28/02* (2009.01)
(Continued)

(52) U.S. Cl.
CPC ....... *H04W 72/042* (2013.01); *H04L 47/2433* (2013.01); *H04L 47/28* (2013.01);
(Continued)

(58) Field of Classification Search
CPC ........................... H04W 68/005; H04W 68/02
(Continued)

(56) References Cited

U.S. PATENT DOCUMENTS 9,282,534 B2 *  3/2016  Nishida ................. H04W 68/02
2010/0220680 A1   9/2010  Ramankutty et al.
(Continued)

FOREIGN PATENT DOCUMENTS

EP        2587850 A1       5/2013
KR     10-2007-0013621    1/2007
(Continued)

OTHER PUBLICATIONS

Extended European Search Report dated Apr. 21, 2016 in connection with European Application 13837287.5, 8 pages.
(Continued)

*Primary Examiner* — Omoniyi Obayanju

(57) ABSTRACT

The present invention relates to a method and apparatus for controlling a specific service in a network congestion state in a wireless communication system. Particularly, the method for controlling a service by a base station in a wireless communication system according to the present invention comprises: a step of receiving a paging message from a mobility management entity (MME) when a certain terminal generates a downlink packet; a step of checking the setup state of the core network domain included in the paging message; and a paging processing step of, if the core network domain is set as a packet-based voice call service, processing the paging message as a priority.

18 Claims, 27 Drawing Sheets

(51) Int. Cl.
  *H04L 29/12* (2006.01)
  *H04M 15/00* (2006.01)
  *H04W 68/12* (2009.01)
  *H04W 28/12* (2009.01)
  *H04L 12/851* (2013.01)
  *H04L 12/841* (2013.01)
  *H04W 68/00* (2009.01)
  *H04W 88/16* (2009.01)
  *H04W 68/02* (2009.01)
  *H04W 48/02* (2009.01)

(52) U.S. Cl.
  CPC .......... *H04L 61/103* (2013.01); *H04M 15/57* (2013.01); *H04W 28/0268* (2013.01); *H04W 28/0289* (2013.01); *H04W 28/12* (2013.01); *H04W 68/00* (2013.01); *H04W 68/12* (2013.01); *H04W 48/02* (2013.01); *H04W 68/02* (2013.01); *H04W 88/16* (2013.01)

(58) Field of Classification Search
  USPC ......................................................... 455/458
  See application file for complete search history.

(56) References Cited

U.S. PATENT DOCUMENTS

| | | | | |
|---|---|---|---|---|
| 2012/0087313 A1* | 4/2012 | Yin | ....................... | H04W 48/16 370/328 |
| 2012/0157132 A1 | 6/2012 | Olsson et al. | | |
| 2014/0031069 A1* | 1/2014 | Yang | ..................... | H04W 68/00 455/458 |
| 2014/0369264 A1 | 12/2014 | Zhu et al. | | |

FOREIGN PATENT DOCUMENTS

| | | | |
|---|---|---|---|
| KR | 10-2010-0053418 | 5/2010 | |
| KR | 10-2011-0139769 | 12/2011 | |
| KR | 10-2012-0095897 | 8/2012 | |
| WO | WO 2011055840 A1 * | 5/2011 | ............ H04W 68/02 |
| WO | WO 2011/085580 A1 | 7/2011 | |
| WO | WO 2011/119996 A1 | 9/2011 | |

OTHER PUBLICATIONS

3GPP TR 23.854 0.4.0, 3rd Generation Partnership Project; Technical Specification Group Services and System Aspects Enhancements for Multimedia Priority Service (Release 10), Mobile Competence Centre; 650, Route Des Lucioles, F-06921 Sophia-Antipolis Cedex, France, Jul. 21, 2010, 38 pages.

International Search Report dated Dec. 31, 2013 in connection with International Patent Application No. PCT/KR2013/008354, 3 pages.

Written Opinion of International Searching Authority dated Dec. 31, 2013 in connection with International Patent Application No. PCT/KR2013/008354, 5 pages.

* cited by examiner

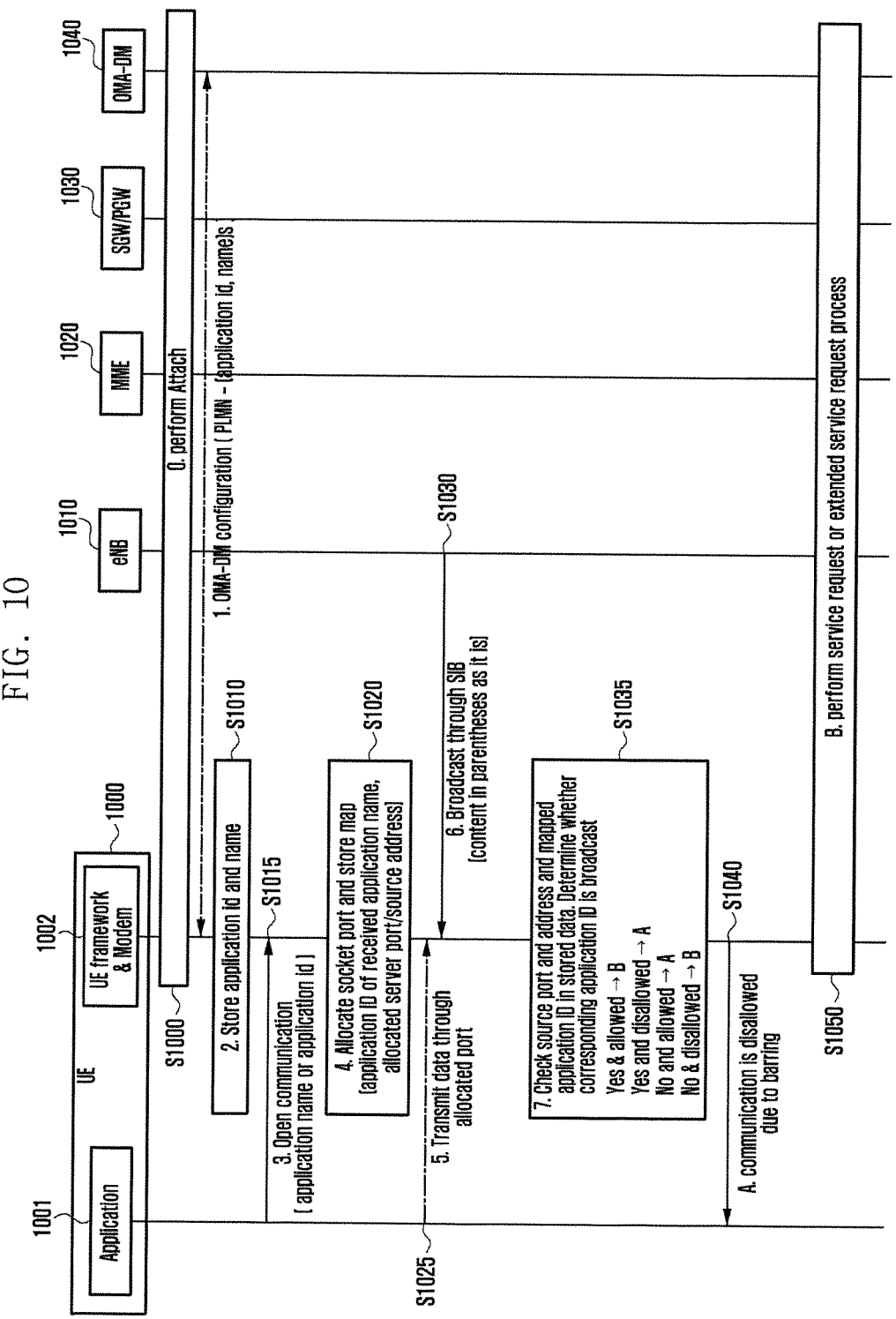

FIG. 16

| 8 | 7 | 6 | 5 | 4 | 3 | 2 | 1 | |
|---|---|---|---|---|---|---|---|---|
| Packet filter identifier 1 ||||||||  Octet 4 |
| Packet filter evaluation precedence 1 |||||||| Octet 5 |
| Length of Packet filter contents 1 |||||||| Octet 6 |
| Packet filter identifier 1 |||||||| Octet 7 Octet m |
| Application index or id |||||||| Octet m+1 |
| ...... ||||||||  |

FIG. 21

```
SIP/2.0 603 Declined
...
Reason: operator determined barring; required_action;
```

FIG. 22

| Data Reference | XML tag | Access Key | Operations |
|---|---|---|---|
| X | IMS_ODB | Data Reference + [ IMS Public User Identity OR MSISDN | Sh-Pull Sh-Update Sh-Subs-Notif |

FIG. 23

| Data type | Tag | Base type | Comments |
|---|---|---|---|
| tODBdata | IMSODB | Enumerated | Possible values:<br>0 (not applied)<br>1 (Barringoutgoingcommunication)<br>2 (Barringoutgoinginternationalcommunication)<br>3 (Barringoutgoinginternationalcommunicationsexceptthosedirected to thehomePLMNcountry)<br>4 (Baring of outgoing communications when roaming outside the home PLMN country)<br>5 (Barring incoming communications)<br>6 (Barring incoming communications when roaming outside the home PLMN country)<br>7 (Barring of Roaming outside the home PLMN)<br>8 (Barring of Roaming outside the home PLMN country)<br>9 (Barring of outgoing Premium Rate Communications (Information))<br>10 (Barring of outgoing Premium Rate Communications (Entertainment))<br>11 (Barring of outgoing Premium Rate Calls (Information) when roaming outside the home PLMN country)<br>12 (Barring of outgoing Premium Rate Calls (Entertainment) when roaming outside the home PLMN country)<br>13 (When registered in the HPLMN, Operator Specific Barring (Type 1))<br>14 (When registered in the HPLMN, Operator Specific Barring (Type 2))<br>15 (When registered in the HPLMN, Operator Specific Barring (Type 3))<br>16 (When registered in the HPLMN, Operator Specific Barring (Type 4)) |

METHOD AND APPARATUS FOR CONTROLLING SPECIFIC SERVICE IN NETWORK CONGESTION STATE IN WIRELESS COMMUNICATION SYSTEM

TECHNICAL FIELD

The present invention relates to a technology for controlling a service in a wireless communication system and, in particular, to a method and apparatus for processing the paging for a specific delay-sensitive service with priority.

Also, the present invention relates to a method and apparatus for improving sensible service quality of the UE through service-specific control especially in the network congestion situation.

Also, the present invention relates to a method and apparatus for an IP Multimedia Subsystem (IMS) network to notify the user of call failure caused by Operator Determined Barring.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution (LTE) is underway in the $3^{rd}$ Generation Partnership Project (3GPP). LTE is a technology designed to provide high speed packet-based communication of up to 100 Mbps. In order to accomplish this aim, a discussion is being held on several schemes such as reducing the number of nodes located in a communication path by simplifying a configuration of the network and approximating wireless protocols maximally to wireless channels.

FIG. 1 is a diagram illustrating normal LTE mobile communication system architecture.

As shown in FIG. 1, the radio access network of the LTE mobile communication system includes a next generation base station (hereinafter, referred to interchangeably as Evolved Node B (eNB), E-UTRAN, and Node B) 110, a Mobility Management Entity (MME) 120, and a Serving Gateway (SGW) 130. The User Equipment (UE) 100 connects to an external network via the eNB, the SGW, and a PDN-Gateway (PGW).

The eNB 110 is a Radio Access Network (RAN) node and corresponds to the BSC of the UTRAN system and the BSC of the GERAN system. The eNB 110 is connected with the UE 100 through a radio channel and performs operations similar to those of the legacy RNC/BSC. The eNB may use a plurality of cells simultaneously.

In LTE, all of the user traffics including real time service such as Voice over Internet Protocol (VoIP) are provided through a shared channel, and thus there is a need of an entity responsible for collecting status information of the UEs and scheduling based thereon such as eNB.

The MME 120 is responsible for various control functions, and a plurality of eNBs may connect to one MME.

The SGW 130 is an entity for providing data bearer which is established or released under the control of the MME 120.

The Application Function (AF) 140 is an entity for exchanging application information with the user at the application level.

The Policy Charging and Rules Function (PCRF) is an entity for controlling policy related to Quality of Service (QoS) of the user and transfers Policy and Charging Control (PCC) rule corresponding to the policy to the PGW 160. The PCRF 150 is an entity of controlling the QoS and billing for traffic. Meanwhile, the term "UP" denotes the paths connecting between the UE 100 and the RAN node 110, between the RAN node and the SGW 130, and the SGW 130 and the PGW 160 for data transmission. Among them, the path between the UE 100 and the RAN node 110 is a radio channel which is most resource-restrictive.

In the radio communication system such as LTE, QoS is applied per Evolved Packet System (EPS) bearer. An EPS bearer is used to transmit the IP flows requiring the same QoS. The EPS bearer may be designated parameters related to QoS such as QoS Class Identifier (QCI) and Allocation and Retention Priority (ARP). The QCI is a parameter defined as an integer indicating QoS priority, and the ARP is a parameter for use in determining whether to accept or reject new EPS bearer establishment.

The EPS bearer corresponds to the Packet Data Protocol (PDP) context of the General Packet Radio Service (GPRS). An EPS bearer belongs to a PDN connection which has the Access Point Name) as an attribute. In the case that a PDN connection for IP multimedia Subsystem (IMS) service such as Voice over LTE (VoLTE), the corresponding PDN connection is established using the well-known IMS APN.

In order to support voice telephony in the LTE network, it is possible to use the Packet Switched (PS) mode IMS-based VoLTE or the CS Fall Back (CSFB) reusing the Circuit Switched (CS) mode of the $2^{nd}$ Generation/$3^{rd}$ Generation (2G/3G) system. VoLTE is the term which can be used in the same concept as Voice over IMS (VoIMS). The terms "VoLTE" and "IMS voice" are used interchangeably hereinafter.

In the case that the UE is in the idle mode, if downlink data or a mobile terminating call addressed to the UE occurs, a paging message is transmitted to notify the UE of the presence of data (or call setup) to receive. Since the paging resource available in one cell is limited, paging messages for plural UEs are crowded, it may occur to transmit the paging messages for part of the UEs due to the restricted paging resource. The voice telephony is a service very sensitive to delay and thus, if the paging signal transmission delay or drop occurs due to the paging channel congestion, the sensible service quality degrades significantly.

Meanwhile, various applications are emerged with the widespread use of smart phones and, in the LTE system supporting only packet networks, the smartphone applications are all classified into packet data applications along with the VoLTE and RCT provided by the operator. There is therefore a need of a method for barring the applications discriminately in the network overload state.

However, since the barring service is activated according to the user's registration as described above, there is a need of defining the UE context to be maintained in HSS, TAS, or SCSCF in order for the operator to bar a certain service arbitrarily. Also, there is no method for notifying the UE of the UE-initiated session failure caused by the Operator Determined Barring.

DISCLOSURE OF INVENTION

Technical Problem

The present invention has been conceived to solve the above problems and aims to provide a method and apparatus for perform the paging for the delay sensitive service such as voice telephony with priority especially when a plurality of pagings are to be transmitted on the restricted resource.

Also, the present invention aims to provide a method and apparatus for barring execution of the applications installed in the UE discriminately especially in the network overload situation.

Also, the present invention aims to notify, when the operator uses the Operator Determined Barring, the UE of this and define a subsequent procedure of the UE.

Solution to Problem

In accordance with an aspect of the present invention, a service control method of a serving gateway in a wireless communication system includes receiving a Packet Data Network (PDN) gateway a packet addressed to a terminal, determining whether the packet is associated with a predetermined service, and transmitting, when the packet is associated with the service, to a Mobility Management Entity (MME) a downlink data notification message configured to process a paging to the terminal with priority.

In accordance with another aspect of the present invention, a service control message of a Mobility Management Entity (MME) in a wireless communication system includes receiving a downlink data notification message from a serving gateway, determining whether a paging to a certain terminal is configured to be processed with priority based on the downlink data notification message, and transmitting, when the paging is configured to be processed with priority, the paging configured to be processed with priority to a base station.

In accordance with another aspect of the present invention, a service control method of a Mobility Management Entity in a wireless communication system includes receiving, when a packet addressed to a certain terminal occurs, a downlink data notification message from a serving gateway, determining whether the packet is associated with a predetermined service, and transmitting, when the packet is associated with the service, to a base station a paging message configured to process a paging to the terminal with priority.

In accordance with another aspect of the present invention, a service control method of a base station in a wireless communication system includes receiving a paging message transmitted by a Mobility Management Entity (MME) when a packet addressed to a terminal occurs, determining whether a paging to the terminal is configured to be processed with priority based on the paging message, and processing, when the paging to the terminal is configured to be processed with priority, the paging to the terminal with priority.

In accordance with another aspect of the present invention, a serving gateway for controlling services in a wireless communication system includes a transceiver which is responsible for transmitting and receiving to and from nodes of the wireless communication system and a control unit which controls receiving a Packet Data Network (PDN) gateway a packet addressed to a terminal, determining whether the packet is associated with a predetermined service, and transmitting, when the packet is associated with the service, to a Mobility Management Entity (MME) a downlink data notification message configured to process a paging to the terminal with priority.

In accordance with another aspect of the present invention, a Mobility Management Entity (MME) for controlling services in a wireless communication system includes a transceiver which is responsible for transmitting and receiving to and from nodes of the wireless communication system and a control unit which controls receiving a downlink data notification message from a serving gateway, determining whether a paging to a certain terminal is configured to be processed with priority based on the downlink data notification message, and transmitting, when the paging is configured to be processed with priority, the paging configured to be processed with priority to a base station.

In accordance with another aspect of the present invention, a Mobility Management Entity (MME) for controlling services in a wireless communication system includes a transceiver which is responsible for transmitting and receiving to and from nodes of the wireless communication system and a control unit which controls receiving, when a packet addressed to a certain terminal occurs, a downlink data notification message from a serving gateway, determining whether the packet is associated with a predetermined service, and transmitting, when the packet is associated with the service, to a base station a paging message configured to process a paging to the terminal with priority.

In accordance with still another aspect of the present invention, a base station for controlling services in a wireless communication system includes a transceiver which is responsible for transmitting and receiving to and from a node or a terminal and a control unit which controls receiving a paging message transmitted by a Mobility Management Entity (MME) when a packet addressed to a terminal occurs, determining whether a paging to the terminal is configured to be processed with priority based on the paging message, and processing, when the paging to the terminal is configured to be processed with priority, the paging to the terminal with priority.

Advantageous Effects of Invention

The present invention is advantageous in terms of protecting against the user's sensible service quality degradation caused by voice call setup delay in such a way of preventing the mobile terminating call paging from being delayed or dropped when the mobile terminating call addressed to the UE occurs in the system supporting VoLTE.

Also, the present invention is advantageous in terms of controlling the congestion efficiently to prevent the service quality from being degraded by barring the applications discriminately in the network overload situation.

Also, the present invention is advantageous in that the UE is capable of being aware of the session request failure caused by the Operator Determined Barring (ODB) and clearing the session immediately.

BRIEF DESCRIPTION OF DRAWINGS

FIG. 10 is a signal flow diagram illustrating a procedure of barring the execution of the applications installed in the UE using the application ID according to the second embodiment of the present invention.

FIG. 16 is a diagram illustrating an exemplary packet filter structure according to an embodiment of the present invention.

FIG. 21 is a diagram illustrating an exemplary response message proposed in an embodiment of the present invention.

FIG. 22 is a diagram illustrating an exemplary UE context transmitted from the HSS to the TAS according to an embodiment of the present invention.

FIG. 23 is a diagram illustrating an exemplary XML schema used for implementing ODB according to an embodiment of the present invention.

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention.

Although the description is directed to the 3GPP LTE in the embodiments of the present invention, it will be understood by those skilled in the art that the present invention can be applied even to other communication systems having the similar technical background and channel format, with a slight modification, without departing from the spirit and scope of the present invention.

In the following, descriptions are made of the first to third embodiments of the present invention.

The first embodiment is directed to a method of performing the paging for a delay sensitive service such as the voice telephony service in a situation where a plurality of pagings are to be transmitted on the restricted resource.

The second embodiment is directed to a method for barring executions of the applications installed in the UE discriminately in the network overload situation The third embodiment is directed to a procedure of notifying the UE of activation of Operator Determined Barring.

First Embodiment

A description is made of the method of paging for delay sensitive service such as voice telephony with priority according to the first embodiment.

In the first embodiment, an example of the delay sensitive service is a packet-based voice call. The packet-based voice call is a concept contrasting the legacy circuit-based voice call and may include VoLTE call and VoIMS call. In the following description, it is assumed that the packet-based voice call is the VoLTE call for convenience purpose.

Figure 1:
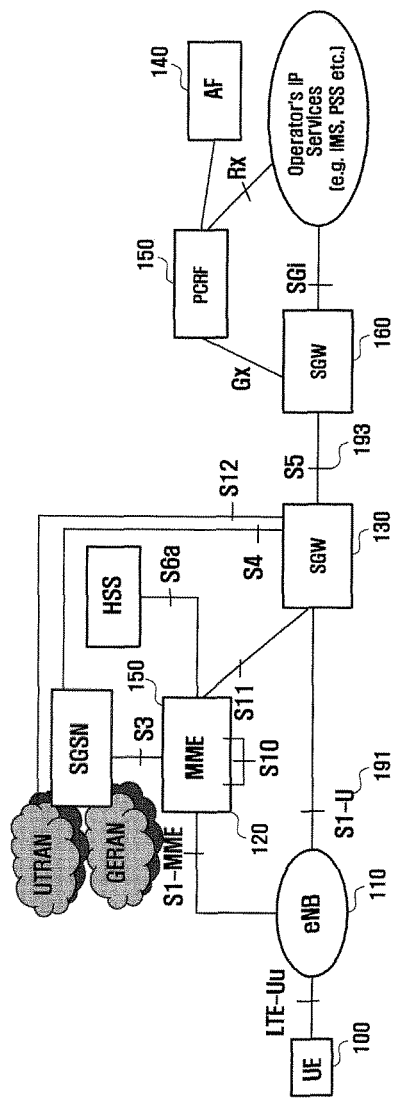
FIG. 1 is a diagram illustrating normal LTE mobile communication system architecture.
Figure 2:
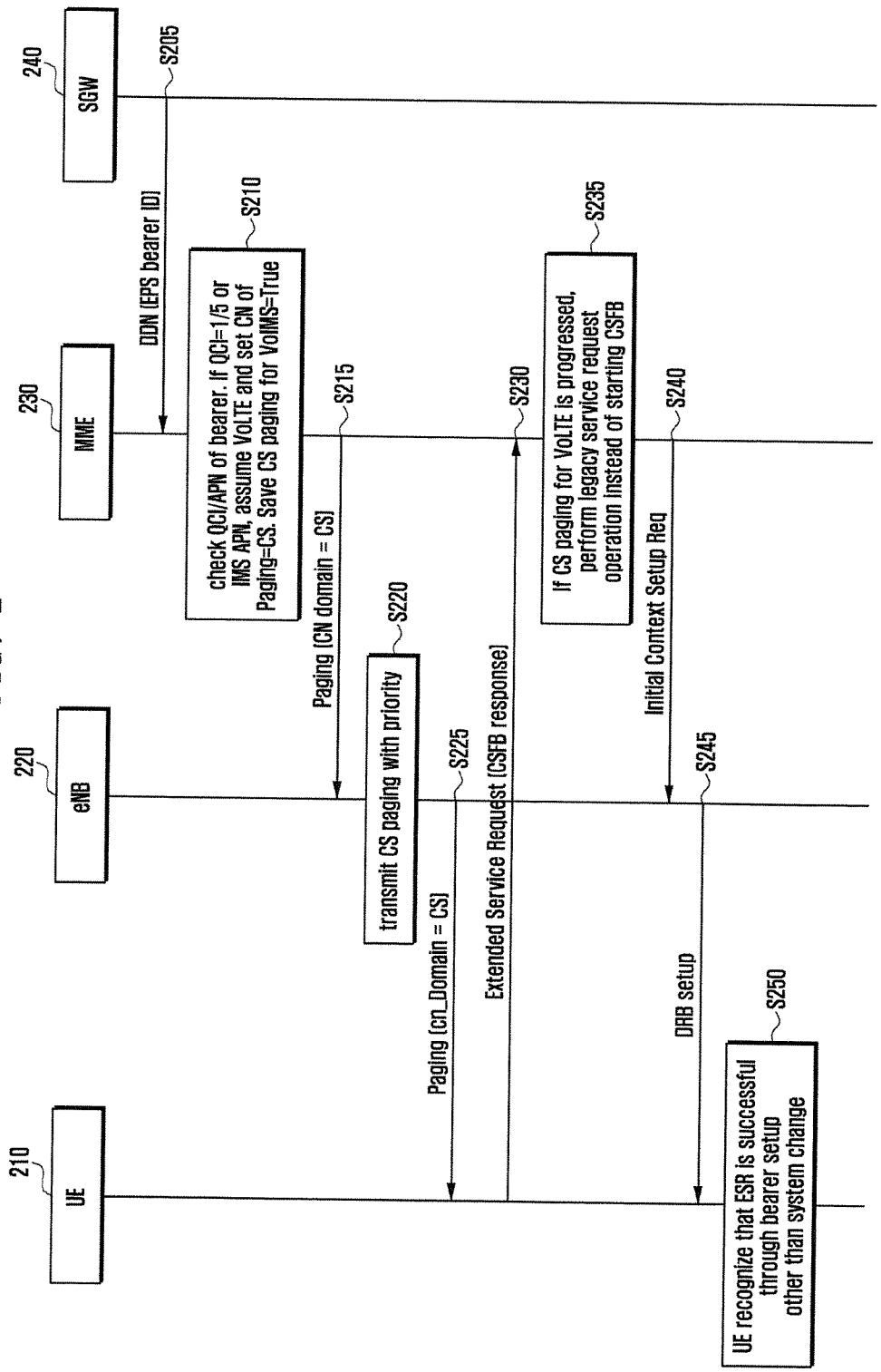
FIG. 2 is a signal flow diagram illustrating exemplary signal flows among the wireless communication system nodes according to the first embodiment of the present invention.

FIG. 2 is a signal flow diagram illustrating exemplary signal flows among the wireless communication system nodes according to the first embodiment of the present invention.

In the case that a downlink packet addressed to the UE 210 in the idle state arrives at the SGW 240, the SGW 240 sends the MME 230 a Downlink Data Notification (DDN) message at step S205. The DDN message includes an EPS bearer Identifier (ID) for identifying the EPS bearer carrying the packet.

If the QCI of the EPS bearer is 1 or 5 based on the EPS bearer context indicated by the EPS bearer ID, the MME 230 determines that the VoLTE call is made at step S210. In the case of VoLTE, the EPS bearer is identified with QCI 1 (media bearer) or QCI 5 (IMS signaling bearer). The MME 230 may check the APN of the PDN connection to which the corresponding EPS bearer belongs and, if it matches the IMS APN, become aware of the occurrence of VoLTE call.

If the VoLTE call occurrence is detected as above, the MME 230 sets the core network (CN) domain, which is included in the paging message transferred to the eNB 220, to Circuit Switched (CS) even though the VoLTE call is the service supported through the PS core network. In order to increase the paging success probability, it may be possible to transmit the paging message to the eNBs within the area larger than that for the normal PS domain paging (i.e. plural cells or plural TAs). The eNBs within the large area means at least one eNB, i.e. plural eNBs. This is because if the paging message is transmitted to one eNB the paging is likely to fail due to the UE mobility but if the paging message is transmitted to multiple eNBs it is possible to prepare for the UE mobility.

If there is no reply from the UE in response to the paging message, the paging is repeated more frequently than the normal data packet, and the timer for determining the failure of receiving the paging response (i.e. Service Request) is set to a value different from that of the timer determining failure of receiving the paging response for a normal data packet.

At the same time, the MME 230 sets the 'CS paging for VoIMS' flag of the UE context to true to memorize the transmission of the CS paging for VoLTE call as PS data.

Then the eNB 220 is configured such that the CN domain transmit the CS paging with priority as compared to the PS paging by taking notice of the characteristic of the delay-sensitive CS call at step S220.

The eNB 220 sends the UE 210 the paging with priority as compared to the PS domain paging according to the configuration at step S225.

Upon receipt of the paging from the eNB 220, the eNB 210 sends the MME 230 an Extended Service Request message including a CSFB response indicator IE set to mobile terminating CS fallback or 1xCS fallback at step S230.

Upon receipt of the Extended service Request message from the UE 210, the MME 230 becomes aware of the "CS paging for VoIMS" which is set to True for the corresponding UE at the previous step although the UE includes the CSFB response indicator in the Extended Service Request message, at step S235. Accordingly, the MME 230 is aware of the occurrence of the VoLTE call other than CS call and performs a normal service request process subsequently instead of the CSFB process.

Accordingly, the MME 230 sends the eNB 220 an Initial Context Setup Request message at step S240, and the eNB 220 sends the UE an RRC Connection Reconfiguration message for Data Radio Bearer (DRB) establishment at step S245.

If the RRC Connection Reconfiguration message for DRB configuration is received from the eNB 220, the UE 210 is aware that the Extended Service Request message has been transmitted successfully at step S250.

In detail, if the UE performing PS-based communication has transmitted the extended service request in response to the CS paging, it is determined that the extended service request is successful only when the system change to the CS network is performed.

In the present invention, if the UE which has received the CS paging transmits the extended service request, it is determined that the extended service request is performed successfully when a bearer configuration message generated according to the legacy PS-based service request operation is received other than when the system is changed.

Summarizing the embodiment of FIG. 2, the MME 230 instructs the eNB 220 to transmit the CS paging, in spite of occurrence of the PS call other than CS call to the UE 210, and records this situation in the UE context. Since the UE 210 has received the CS paging from the eNB 220, it transmits the Extended Service Request message to the MME 230, and the MME 230 checks the recorded UE context to recognize that the CS-extended service request of the UE is the PS service request and thus performs a procedure based on the PS service request.

Figure 3:
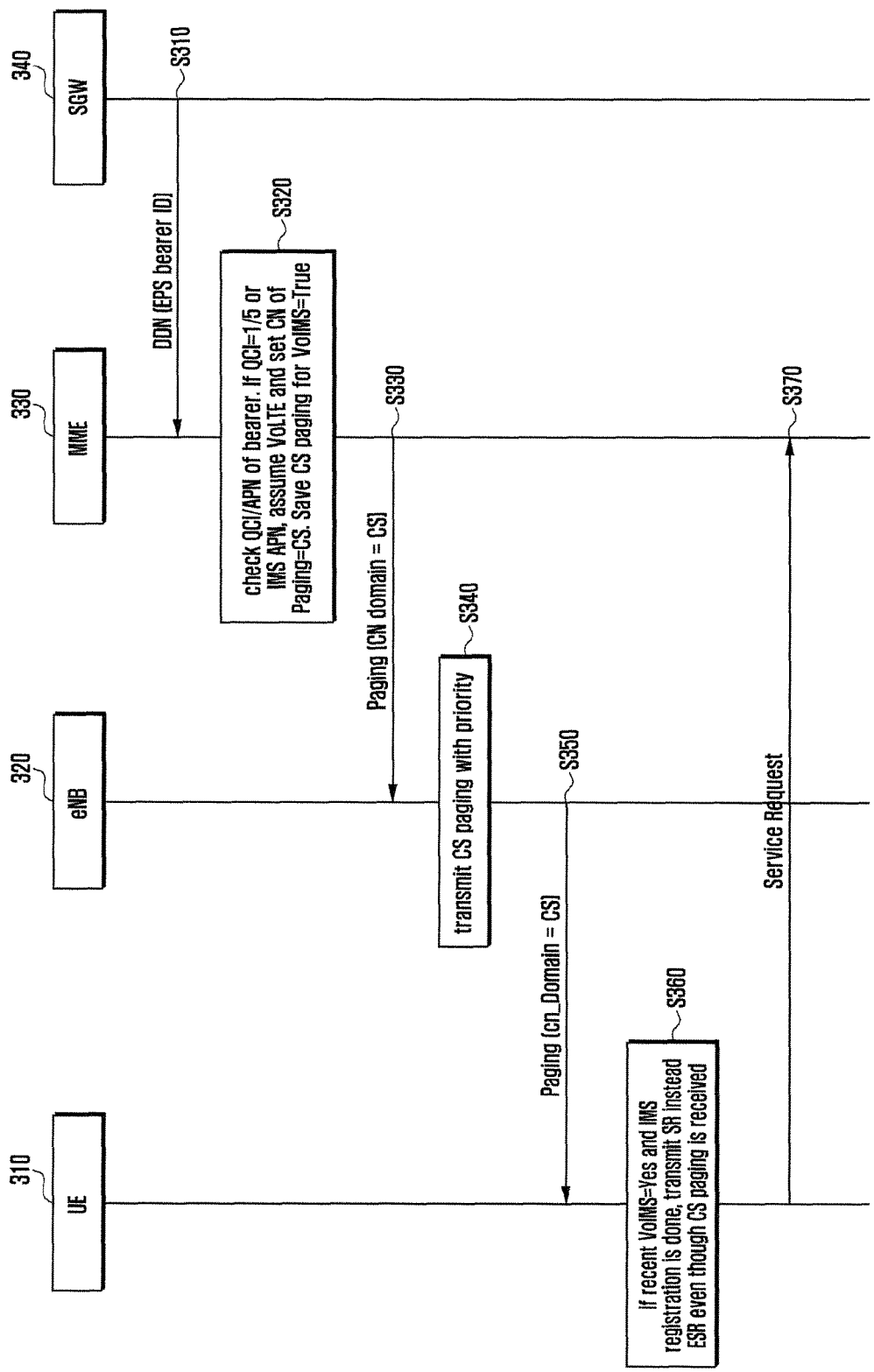
FIG. 3 is a signal flow diagram illustrating other exemplary signal flows among the wireless communication system nodes according to the first embodiment of the present invention.

FIG. 3 is a signal flow diagram illustrating other exemplary signal flows among the wireless communication system nodes according to the first embodiment of the present invention.

If the downlink packet addressed to the UE 310 in the idle state arrives at the SGW 340, the SGW 340 sends the MME 330 a Downlink Data Notification (DDN) message. The DDN message includes an EPS bearer Identifier (ID) for identifying the EPS bearer carrying the packet.

If the QCI of the EPS bearer is 1 or 5 based on the EPS bearer context indicated by the EPS bearer ID, the MME 330 determines that the VoLTE call is made at step S320. In the case of VoLTE, the EPS bearer is identified with QCI 1 (media bearer) or QCI 5 (IMS signaling bearer). The MME 330 may check the APN of the PDN connection to which the corresponding EPS bearer belongs and, if it matches the IMS APN, recognize the occurrence of VoLTE call.

If the VoLTE call occurrence is detected as above, the MME 330 sets the core network (CN) domain, which is included in the paging message transferred to the eNB 320, to Circuit Switched (CS) even though the VoLTE call is the service supported through the PS core network. In order to increase the paging success probability, it may be possible to transmit the paging message to the eNBs within the area larger than that for the normal PS domain paging (i.e. plural cells or plural TAs). The eNBs within the large area means at least one eNB, i.e. plural eNBs. This is because if the paging message is transmitted to one eNB the paging is likely to fail due to the UE mobility but if the paging message is transmitted to multiple eNBs it is possible to prepare for the UE mobility.

If there is no reply from the UE in response to the paging message, the paging is repeated more frequently than the normal data packet, and the timer for determining the failure of receiving the paging response (i.e. Service Request) is set to a value different from that of the timer determining failure of receiving the paging response for a normal data packet.

At the same time, the MME 330 sets the 'CS paging for VoIMS' flag of the UE context to true to memorize the transmission of the CS paging for VoLTE call as PS data.

Then the eNB 320 is configured such that the CN domain transmit the CS paging with priority as compared to the PS paging by taking notice of the characteristic of the delay-sensitive CS call at step S340.

The eNB 320 sends the UE 310 the paging with priority as compared to the PS domain paging according to the configuration at step S350.

Upon receipt of the paging from the eNB 230, although the cn_Domain of the paging message is set to CS, if an 'IMS voice over PS session in S1 mode supported' is received through the 'EPS network feature support IE' of the most recent Attach Accept message or TAU accept message and if the IMS registration is successful, the UE 310 sends the MME 330 a service request message for PS service instead of the Extended Service Request message for CSFB at step S370.

According to the embodiment of FIG. 3, if a specific condition is fulfilled, the UE 310 sends the MME 330 a service request message for PS service instead of the Extended Service Request message for CS service, although the CS paging is received.

Figure 4:
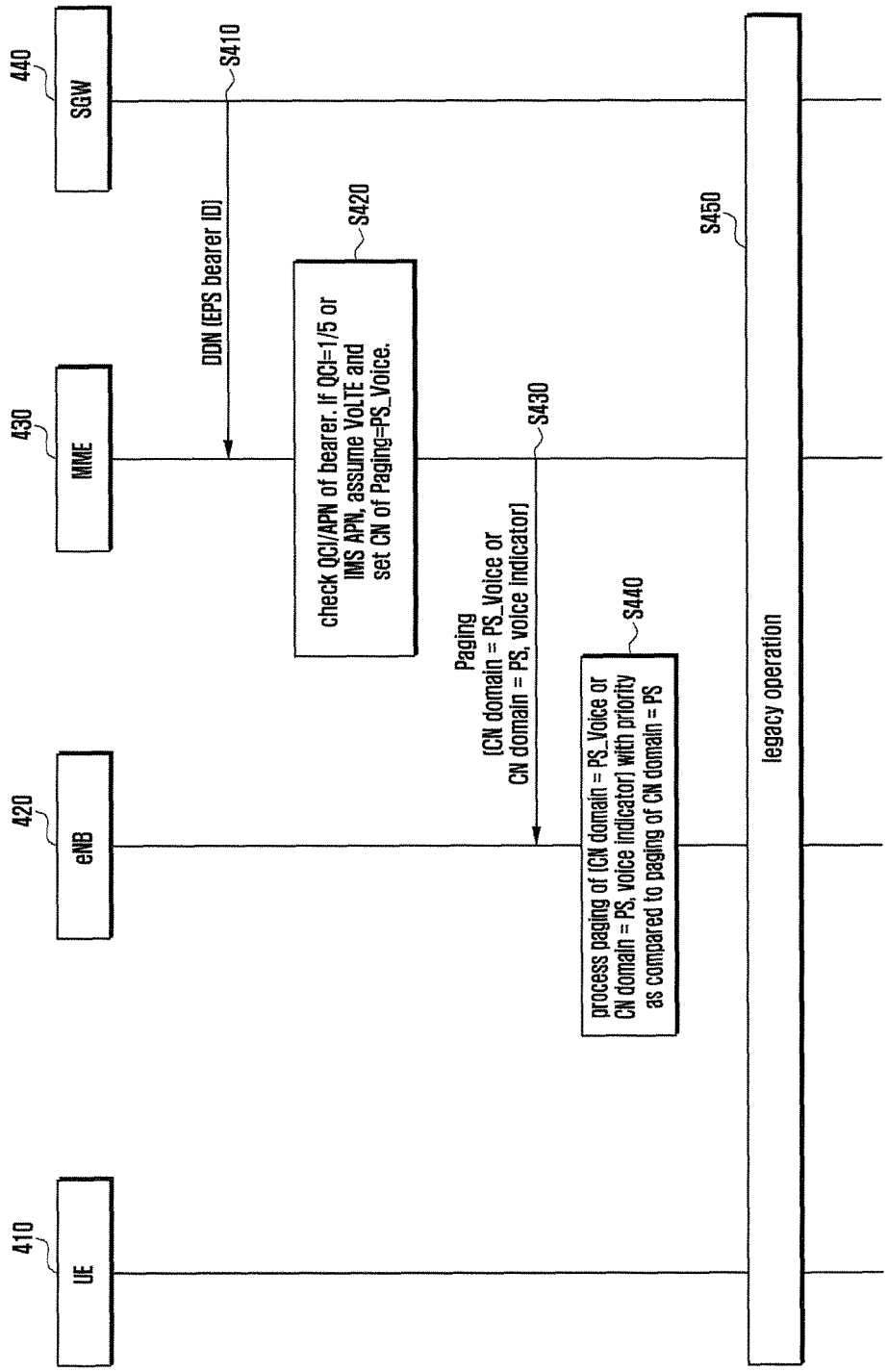
FIG. 4 is a signal flow diagram illustrating still other exemplary signal flows among the wireless communication nodes according to the first embodiment of the present invention.

FIG. 4 is a signal flow diagram illustrating still other exemplary signal flows among the wireless communication nodes according to the first embodiment of the present invention.

If the downlink packet addressed to the UE 410 in the idle state arrives at the SGW 440, the SGW 440 sends the MME 430 a Downlink Data Notification (DDN) message. The DDN message includes an EPS bearer Identifier (ID) for identifying the EPS bearer carrying the packet.

If the QCI of the EPS bearer is 1 or 5 based on the EPS bearer context indicated by the EPS bearer ID, the MME 430 determines that the VoLTE call is made at step S420. In the case of VoLTE, the EPS bearer is identified with QCI 1 (media bearer) or QCI 5 (IMS signaling bearer). The MME 430 may check the APN of the PDN connection to which the corresponding EPS bearer belongs and, if it matches the IMS APN, recognize the occurrence of VoLTE call.

In this case, the MME 430 sends the eNB 420 the paging message including the information notifying of the paging for VoLTE service although the CN domain is PS. As shown in the drawing, it is an example that the CN domain of the paging message is set to PS_Voice. In another example, the MME may include a Voice indicator indicating that the corresponding service is associated with the voice call along with the CN Domain set to PS in the paging message. In order to increase the paging success probability, it may be possible to transmit the paging message to the eNBs within the area larger than that for the normal PS domain paging (i.e. plural cells or plural TAs). The eNBs within the large area means at least one eNB, i.e. plural eNBs. This is because if the paging message is transmitted to one eNB the paging is likely to fail due to the UE mobility but if the paging message is transmitted to multiple eNBs it is possible to prepare for the UE mobility.

If there is no reply from the UE in response to the paging message, the paging is repeated more frequently than the normal data packet, and the timer for determining the failure of receiving the paging response (i.e. Service Request) is set to a value different from that of the timer determining failure of receiving the paging response for a normal data packet.

Although the CN domain is PS, if it is recognized that the paging is related to the VoLTE service, i.e. if the paging is related to the packet-based voice call service, the eNB 420 is configured to transmit the corresponding paging with priority. As shown in the drawing, if the CN domain of the paging message is set to PS_Voice, this paging is transmitted with priority as compared to the paging message of which CN domain is set to PS. Upon receipt of this, the UE performs the normal Service Request process.

According to the embodiment of FIG. 4, if downlink data, particularly VoLTE, addressed to the UE 410 occurs, the MME 430 sends the eNB 420 the paging information including an indicator informing of the occurrence of the packet-based voice call service. Then the eNB 420 processes the paging for the packet-based voice call service with priority as compared to the CS service.

Figure 5:
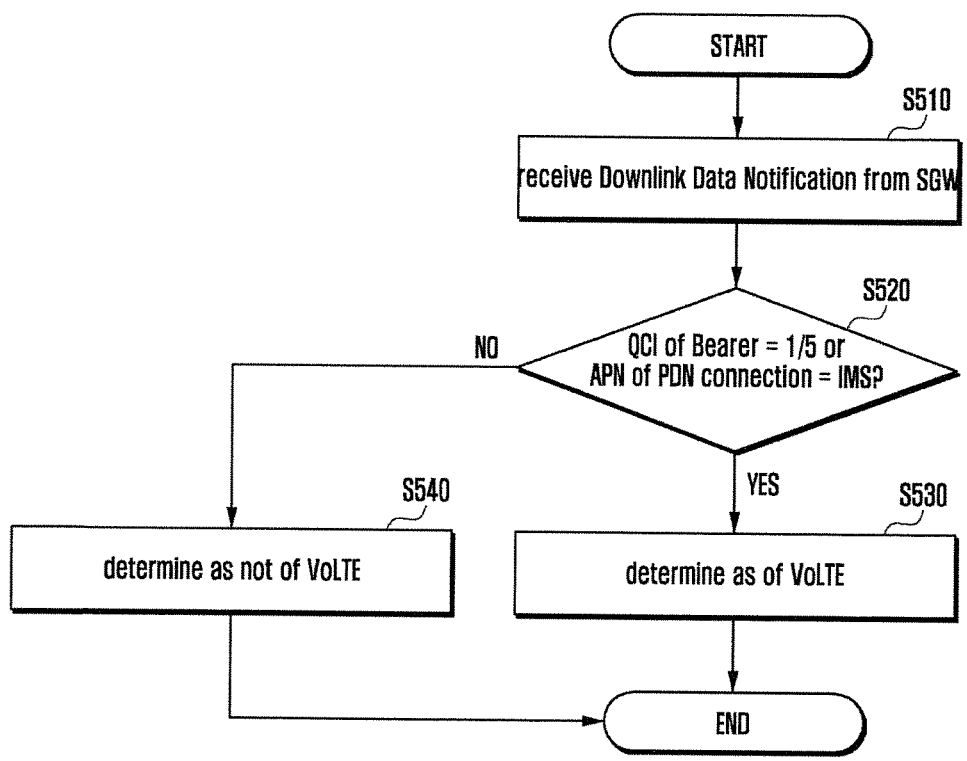
FIG. 5 is a flowchart illustrating a method for the MME to determine that the packet addressed to the UE in the idle state is of VoLTE based on the DDN message received from the SGW.

FIG. 5 is a flowchart illustrating a method for the MME to determine that the packet addressed to the UE in the idle state is of VoLTE based on the DDN message received from the SGW.

If a downlink packet addressed to the UE in the idle state arrives at SGW, the MME receives the Downlink Data Notification (DDN) message from the SGW at step S510. The DDN message includes an EPS bearer Identifier (ID) for identifying the EPS bearer carrying the packet.

If the QCI of the EPS bearer is 1 or 5 based on the EPS bearer context indicated by the EPS bearer ID, the MME determines that the VoLTE call is made at step S520. In the case of VoLTE, the EPS bearer is identified with QCI 1 (media bearer) or QCI 5 (IMS signaling bearer). The MME 530 may check the APN of the PDN connection to which the corresponding EPS bearer belongs and, if it matches the IMS APN, recognize the occurrence of VoLTE call. The MME operation in FIG. 5 may be used along with the embodiments of FIGS. 2 to 4.

As a result, if either the CQI of the EPS bearer is 1 or 5 or the APN of the PDN connection is identical with the IMS APN at step S520, the MME determines that the corresponding downlink packet is of VoLTE at step S530. Otherwise, the MME determines that the corresponding downlink packet is not of VoLTE at step S540. In this case, the MME may transmit the paging message to the eNBs within the area larger than that for the normal PS domain paging (i.e. plural cells or plural TAs) in order to increase the paging success probability. The eNBs within the large area means at least one eNB, i.e. plural eNBs. This is because if the paging message is transmitted to one eNB the paging is likely to fail due to the UE mobility but if the paging message is transmitted to multiple eNBs it is possible to prepare for the UE mobility.

If there is no reply from the UE in response to the paging message, the paging is repeated more frequently than the normal data packet, and the timer for determining the failure of receiving the paging response (i.e. Service Request) is set to a value different from that of the timer determining failure of receiving the paging response for a normal data packet.

Figure 6:
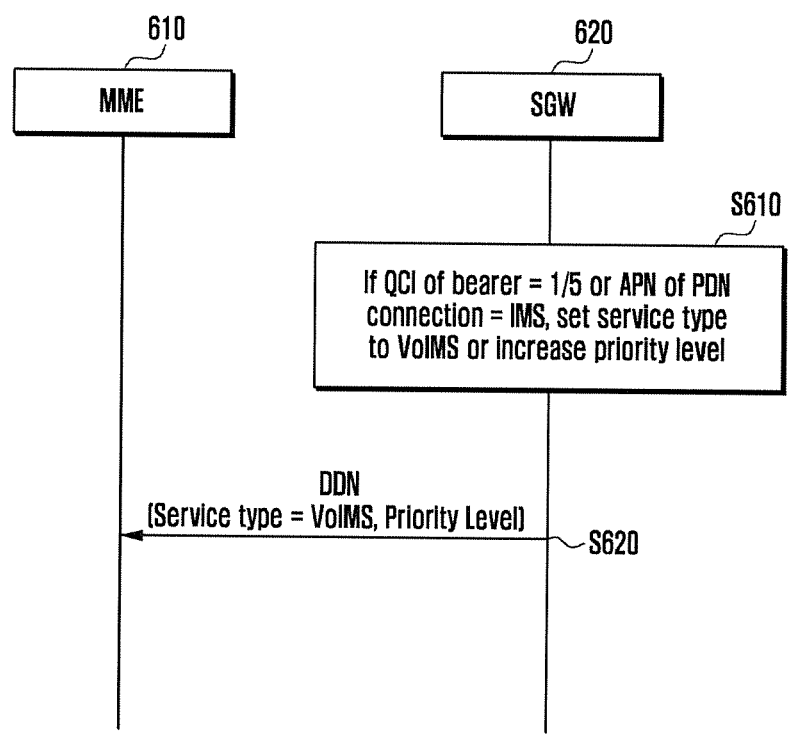
FIG. 6 is a signal flow diagram illustrating a method for the SGW to notify the MME whether the user packet received from a PGW is a VoLTE (or IMS voice service) packet according to an example of the first embodiment of the present invention.

FIG. 6 is a signal flow diagram illustrating a method for the SGW to notify the MME whether the user packet received from a PGW is a VoLTE (or IMS voice service) packet according to an example of the first embodiment of the present invention.

By referencing that the context of the bearer to which the packet received from the PGW 610 belongings, if the QCI of the corresponding EPS bearer is 1 or 5, the SGW 620 determines the occurrence of the VoLTE call. This is because the EPS bearer is identified with QCI 1 (media bearer) or QCI 5 (IMS signaling bearer) in the case of VoLTE.

The SGW 520 checks the APN of the PDN connection to which the corresponding EPS bearer belongs and, if it matches the IMS APN, recognizes the occurrence of VoLTE call. In this case, the SGW 620 may insert the IE notifying of VoIMS or the priority level set to high in the DDN message transmitted to the MME 610. At this time, the service type or priority level may be indicated by means of the ARP. For example, ARP 0 may indicate the service with the highest paging priority and ARP 1 the service with the next highest priority.

If the DDN message is received from the SGW 620, the MME checks the DDN indicates the VoLTE or high priority and then omits the operation for identifying the VoLTE call when performing the operations corresponding to FIGS. 2 to 4. In order to increase the paging success probability, it may be possible to transmit the paging message to the eNBs within the area larger than that for the normal PS domain paging (i.e. plural cells or plural TAs). The eNBs within the large area means at least one eNB, i.e. plural eNBs. This is because if the paging message is transmitted to one eNB the paging is likely to fail due to the UE mobility but if the paging message is transmitted to multiple eNBs it is possible to prepare for the UE mobility.

If there is no reply from the UE in response to the paging message, the paging is repeated more frequently than the normal data packet, and the timer for determining the failure of receiving the paging response (i.e. Service Request) is set to a value different from that of the timer determining failure of receiving the paging response for a normal data packet.

Figure 7:
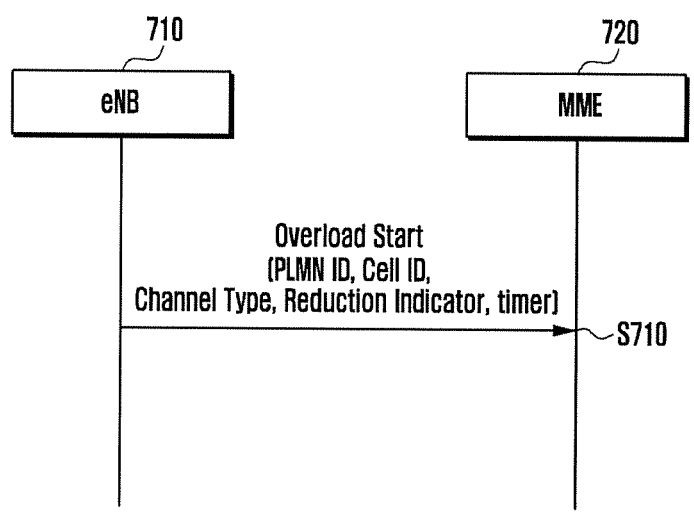
FIGS. 7 and 8 are flowcharts illustrating an operation of notifying MME of a traffic congestion occurring in a certain channel and the traffic congestion being resolved according to the first embodiment of the present invention.
Figure 8:
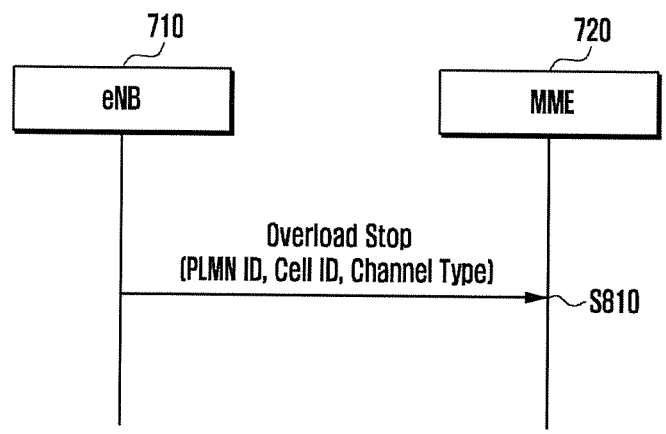

FIGS. 7 and 8 are signal flow diagrams illustrating methods for an eNB to notify an MME of congestion occurrence and resolution on a specific channel according to the first embodiment of the present invention.

In this embodiment, the description is made of the exemplary case where the paging channel is congested. If the paging channel is congested, the eNB 710 sends the MME 720 an Overload Start message at step S710. This message may include a PLMN ID and cell ID of the cell in which the congestion has occurred, the congested channel (paging channel in this embodiment), congestion level or load level required to resolve the congestion, and congestion continuation time.

If the Overload Start message is received from the eNB 710, the MME assumes that the corresponding channel of the corresponding cell is congested afterward and, if the Overload Start message includes the congestion continuation time, starts a timer to check the expiry of the congestion time.

As shown in FIG. 8, the MME 720 may receive an Overload Stop message notifying that the congestion is resolved in the corresponding cell from the eNB 710 at step S810. Then the MME 720 assumes that the congestion has been resolved on the corresponding channel of the corresponding cell. If the Overload Start message includes the congestion continuation time the MME assumes that the congestion continues until the time expires. The MME may start a timer according to its internal time, even when the Overload Start message has no congestion continuation time, to count the running duration of the timer as the continuation of the congestion.

If the congestion occurs or is resolved on a specific channel (paging channel in this embodiment) of a specific cell of the eNB, the eNB notifies the MME of this through S1AP signaling as shown in FIGS. 7 and 8 or using a O&M method in another embodiment. This may include a procedure for the eNB to notify the O&M server of its congestion state and a procedure for the O&M server to notify other nodes (MME, PGW, etc.) of the eNB congestion state. The messages exchanged between the nodes include the information similar to that mentioned in the descriptions of FIGS. 7 and 8. Upon receipt this message, the MME and PGW assume that the congestion has occurred or has been resolved on the specific channel of the specific cell of the corresponding eNB.

Figure 9A:
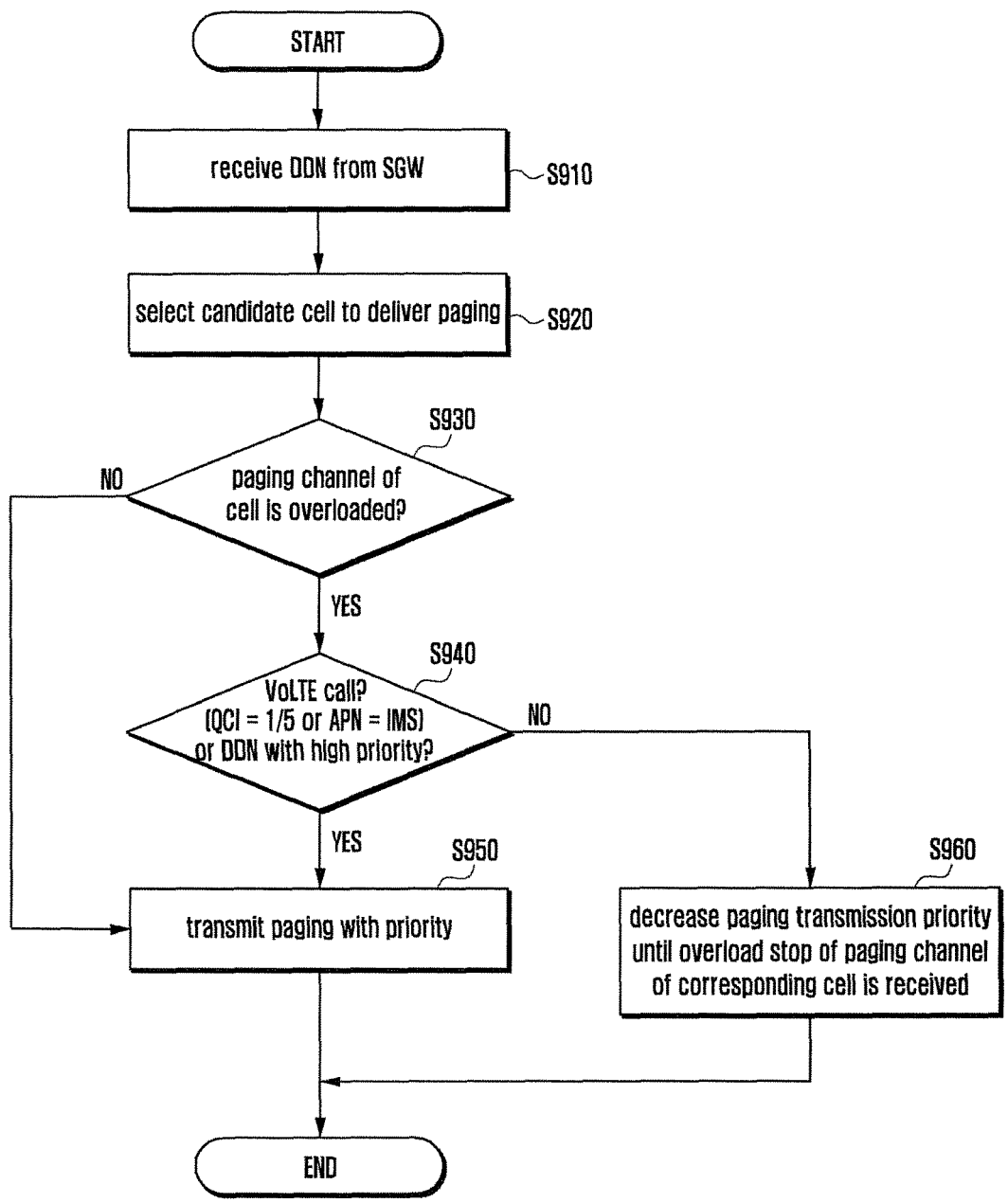
FIG. 9a is a flowchart illustrating an operation procedure of the MME received the information notifying of the congestion of the paging channel from the eNB.

FIG. 9a is a flowchart illustrating an operation procedure of the MME received the information notifying of the congestion of the paging channel from the eNB.

The MME 720 receives a DDN message for the UE in the idle mode from the SGW at step S910. Then the MME 720 selects candidate cells for transmitting the paging message based on the stored context at step 920. The MME 720 determines whether the overload start message notifying of the congestion on the paging channel is received from each candidate cell at step S930.

If the overload start message is received from the corresponding cell, the MME 720 checks that the service type of the packet corresponding to the DDN is VoLTE or a service with a high priority through the above-described method (method of FIG. 5 in which the MME checks it autonomously or the method of FIG. 6 in which the SGW informs of it through DDN) at step S940. If the service type of the packet is VoLTE or a service with a high priority, the MME 720 transmits the paging message to the corresponding cell with priority at step S950. At this time, the MME 720 sets the CN domain of the paging message to PS.

If the EPS bearer recognized by the DDN is not for VoLTE service or the service with a high priority, the MME 720 decreases the transmission priority of the paging message until the overload stop message notify of the end of the congestion on the paging channel of the corresponding cell is received from the eNB using the corresponding cell.

In the above embodiment, it is noted that the congestion report process is not mandatory. That is, although a cell of the specific eNB does not send any congestion report, the MME may transmit the paging for the VoLTE service with priority as compared to the paging for the normal PS data service.

Through the embodiment of FIG. 9a, the MME 720 may determine whether to transmit the paging message based on the paging channel state information of the cell notified by the eNB. In this way, it is possible to transmit the paging for the VoLTE service with priority through the congested paging channel. It is also possible to determine whether to transmit the paging depending on the congestion status of the eNB through above described O&M-based method.

Figure 9B:
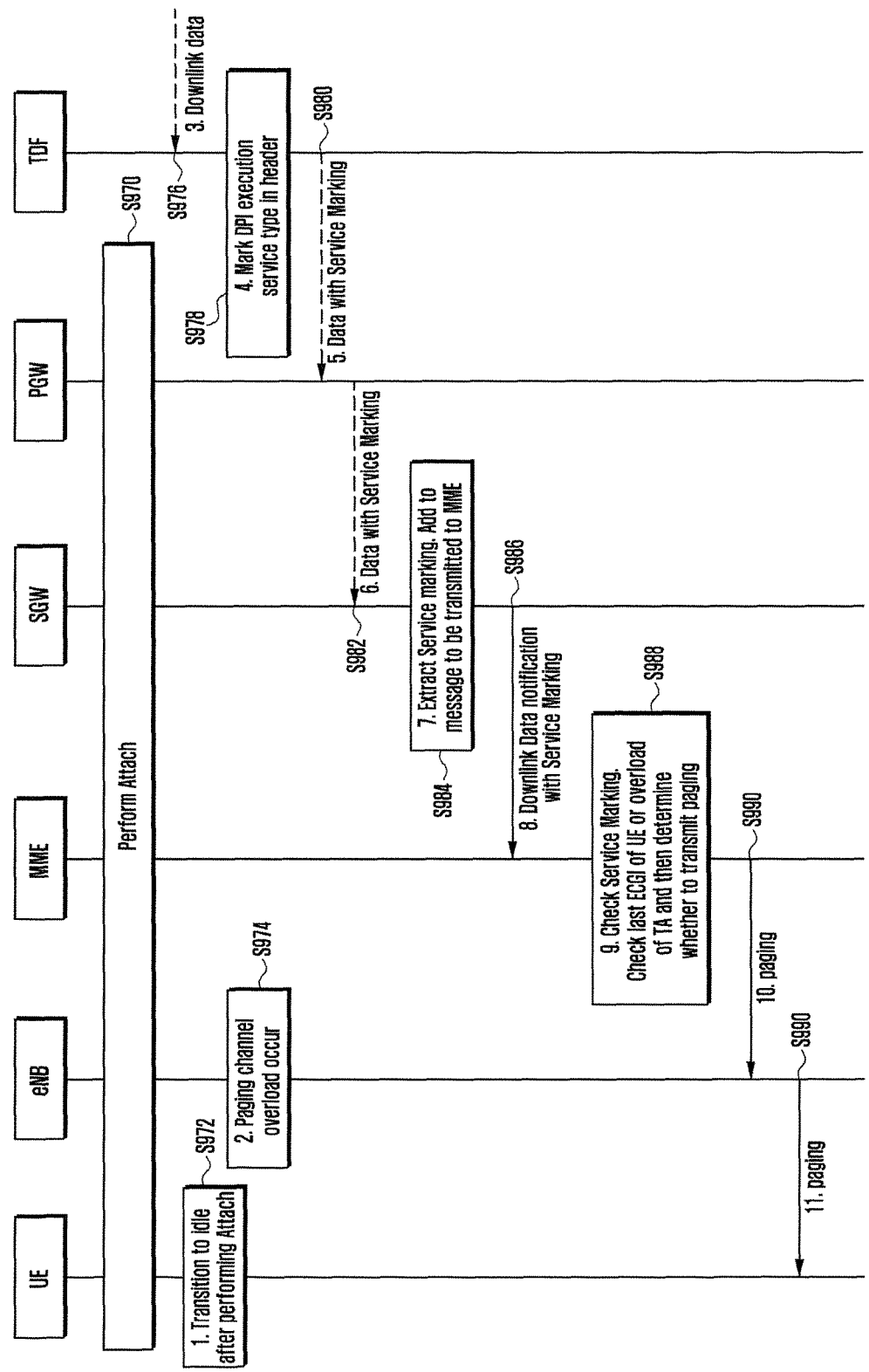
FIG. 9b is a signal flow diagram illustrating signal flows among the intra-network nodes in the congestion situation using a service marking.

FIG. 9b is a signal flow diagram illustrating signal flows among the intra-network nodes in the congestion situation using a service marking.

As described with reference to FIGS. 7 and 8, if a specific channel of a specific cell of the eNB is congested, the eNB may notify the MME and PGW of the congestion state through the signaling method or the O&M method, and the PGW/TDF/MME operation to be described with reference to FIG. 9b may be performed in consideration thereof. However, it is noted that the embodiment of FIG. 9b may not include the above congestion report procedure.

The UE performs a network attach procedure at step S970 and, if the network attach procedure is completed, enters the idle mode at step S972. If congestion occurs in a specific cell or on a specific channel of the eNB, the eNB notifies of the MME of the congestion.

If a downlink packet addressed to the UE occurs at step S976, the Traffic Detection Function (TDF) or the PGW analyzes the content of the downlink packet and inserts the service information into the Service Class Identity (SCI) field of the header (GTP-U) of the packet transferred to the next node at step S978. In an embodiment of the present invention, the SCI value may be used as an identifier for identifying PS-based voice call service or other service (messaging, video telephony, Rich Communication Suite (RCS)).

If the header of the GTP-U packet received from the TDF or PGW includes a marked SCI field, the SGW extracts it at step S984. Then the SGW sends the MME the DDN message including the SCI field at step S986.

Upon receipt of the DDN, the MME selects a candidate cell for transmitting the paging and, if the paging channel of the cell is congested, checks the SCI field which the SGW has inserted in the DDN at step S988. If it is determined that the paging is for the PS voice call service or a service with a high priority, the MME processes the paging with priority at step S990 and, otherwise, performs a determination process for delaying the paging.

The above embodiments may be extended to an embodiment may be extended to an embodiment of processing, when the congestion occurs between the control plane (eNB) and the core network or at the control signaling exchange part among the core network entities, the paging for the service with a high priority such as PS voice call with priority and then the padding for the service with a low priority.

If the congestion occurs on the control plane (e.g. the paging signal processing overload occurs at the eNB or the MME), another effective method for reducing the signaling on the control plane is to throttle the DDN messages transmitted by the SGW when the downlink message addressed to the UE in the idle state occurs. If a downlink message addressed to the UE in the idle state occurs, the SGW sends the MME the DDN message, and the MME transmits the paging request to the eNB(s) based on the DDN message. The eNB(s) transmits the paging message. If the paging message is received, the UE performs a service request process for receiving the downlink message. The DDN transmitted by the SGW causes several control messages such as paging and service request, this is likely to contribute to the congestion on the control plane.

In order to solve the above problems, when the congestion occurs on the control plane, the MME may request the SGW to throttle the number or transmission frequency of the DDN messages. In this requesting process, the MME may be aware of the services of which DDN messages are to be throttled or allowed and may provide with the information for use in determining the time of applying the throttling. Upon receipt of the request, if the downlink message to be delivered to the UE belongs to the target service, the SGW determines whether to transmit the DDN message according to the throttling factor and throttling delay.

Figure 26:
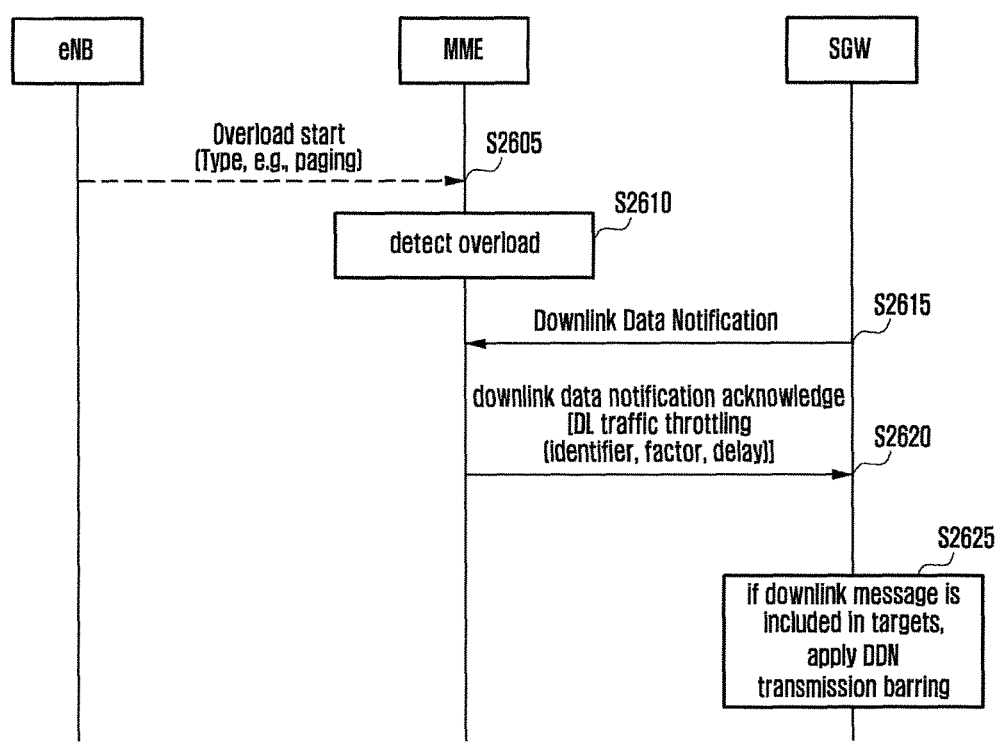
FIG. 26 is a signal flow diagram illustrating the operation according to another embodiment of the present invention.

FIG. 26 is a signal flow diagram illustrating the operation according to another embodiment of the present invention.

The MME determines whether congestion occurs on the control plane at step S2610. The determination may be made in such a way of comparing its processing amount and the number of tasks (or messages) to be processed or, when the connected eNBs has informed of the congestion at step S2605, considering the congestion information (e.g. the information notifying that the congested channel is the paging channel).

Afterward, if the DDN message is received form the SGW at step S2615, the MME sends the SGW a DDN Acknowledge (Ack) message including an Information Element (IE) indicating that the number of DDN messages has to be decreased due to the congestion (e.g. DL traffic throttling IE) at step S2620.

At this time, the above IE may include at least one of throttling target, throttling exception target, throttling delay, and throttling factor as the information for use in controlling the DDN message at the SGW.

In the case that the throttling target is includes, if the downlink message is included in the throttling target, the SGW applies the DDN transmission throttling at step S2625. In the case that the throttling exception target is included, if the downlink message is included in the throttling exception target, the SGW does not apply the DDN transmission throttling. At this time, the information for identifying the target may be any of Allocation and Retention Priority (ARP), QoS Class Identifier (QCI), UE identifier, and Service Class Identifier (SCI). In the case that the throttling delay is included, the SGW applies the throttling during the throttling delay. The throttling factor is a value indicating the ratio of the message to be throttled to the entire DDN messages supposed to be transmitted.

If no throttling/exception target is included in the throttling request of the MME, the SGW may determine the throttling target based on a predetermined ARP or QCI.

For example, the DDN Ack message sent by the MME includes the exception target identified by QCI set to 5, throttling delay set to 10, and throttling facto set to 40, the SGW sends the MME 60% of the DDN messages necessary for the packets belonging to the bearer of which QCI is not 5 for 10 seconds. If the DDN Ack message sent by the MME includes the exception target identified by SCI of the messenger service, throttling delay set to 10, and throttling factor set to 40, the SGW compares the target CSI with the SCI field of the GTP-U header of the packet received from the PGW to send the MME 60% of the DDN messages necessary for the packets having the matched CSI for 10 seconds. If the MME notifies of only the throttling delay set to 10 and throttling factor set to 40% and if the SGW is configured to do not apply the throttling to the packets belonging to the bearer of which QCI is 5, the SGW sends the MME 60% of the DDN messages necessary for the packets belonging to the bearer of which QCI is not 5 for 10 seconds.

Meanwhile, when the congestion occurs on the control plane, the DDN message throttling may be requested by means of a separate message other than the DDN Ack message.

Figure 27:
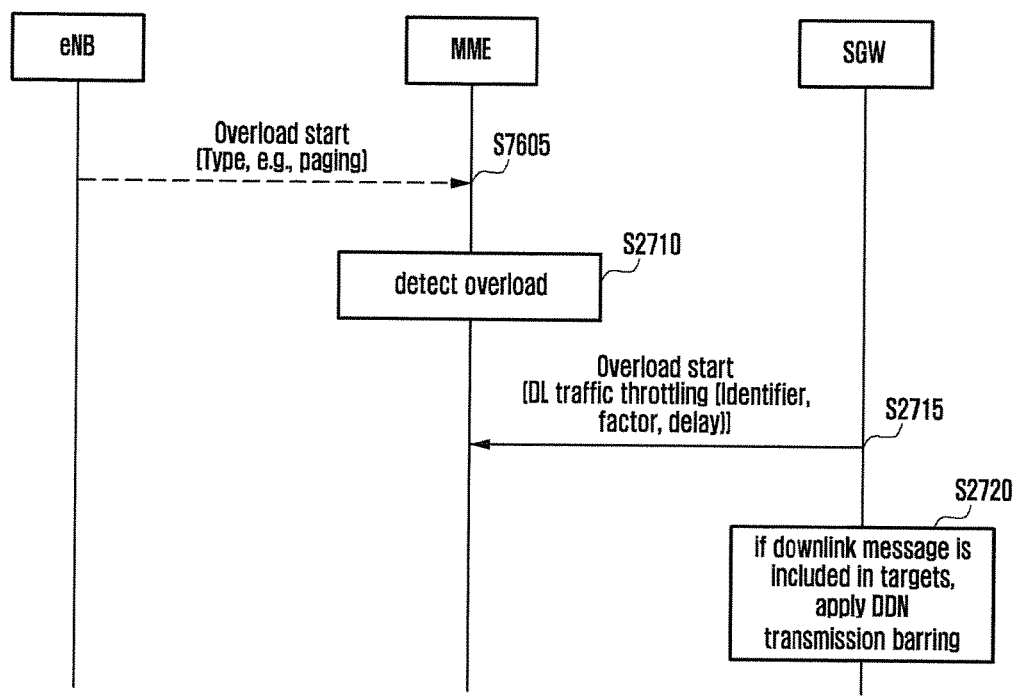
FIG. 27 is a signal flow diagram illustrating the operation according to another embodiment of the present invention.

FIG. 27 is a signal flow diagram illustrating the operation according to another embodiment of the present invention.

The MME determines whether congestion occurs on the control plane at step S2610. The determination may be made in such a way of comparing its processing amount and the number of tasks (or messages) to be processed or, when the connected eNBs has informed of the congestion at step S2705, considering the congestion information (e.g. the information notifying that the congested channel is the paging channel).

Afterward, the MME sends the SGW a message requesting for throttling the number of DDN messages due to the congestion (e.g. overload start or error indication message) at step S2715. At this time, this message may include at least one of throttling target, throttling exception target, throttling delay, and throttling factor, as the information for use in controlling the DDN messages at the SGW.

In the case that the throttling target is includes, if the downlink message is the target, the SGW applies the DDN transmission throttling at step S2720.

In the case that the throttling exception target is included, if the downlink message is the target, the SGW does not apply the DDN transmission throttling. At this time, the information for identifying the target may be any of Allocation and Retention Priority (ARP), QoS Class Identifier (QCI), UE identifier, and Service Class Identifier (SCI). In the case that the throttling delay is included, the SGW applies the throttling during the throttling delay. The throttling factor is a value indicating the ratio of the message to be throttled to the entire DDN messages supposed to be transmitted. If no throttling/exception target is included in the throttling request of the MME, the SGW may determine the throttling target based on a predetermined ARP or QCI. The operation of the SGW which receives this message is identical with that in the DDN Ack-based embodiment. If the congestion on the control plane is resolved, the MME sends the SGW a message for notifying that the DDN message throttling is not necessary any more, e.g. overload stop message, explicitly.

Second Embodiment

A description is made of the second embodiment which is directed to a method of controlling execution of the applications installed in the UE discriminately in a network overload situation hereinafter.

1) Solution 1: Method of Using Application ID

FIG. 10 is a signal flow diagram illustrating a procedure of barring the execution of the applications installed in the UE using the application ID according to the second embodiment of the present invention.

The UE 1000 performs a network attach procedure at step S1000. Then the operator configures the application name and application ID to the UE through OMA-DM at step S1005. The UE frame work & modem 1002 of the UE 1000 stores the application name and application ID.

Afterward, the operator broadcasts the IDs of the applications to be barred access to the network and parameters for barring through the SIB of the eNB at step S1030. The parameters may include the barring time and the barring factor.

Meanwhile, when the application 1001 of the UE 1000 opens a socket for data transmission/reception, the application 1001 sends the UE framework and modem 1002 the parameters such as the name of the corresponding application and application ID received from the operator at step 1015.

The OS or the service frame work, i.e. the UE framework and modem 1002, of the UE which generates the socket and allocates port number stores allocated port number and UE address, the application name as parameter transmitted by the application 1001, and application ID mapped to the application name allocated by the operator. That is, the source address and source port used by the application 1001 and the ID set by the operator for the application are mapped to be stored.

At step S1025, when the application 1001 is about to transmit data and thus a request for transitioning to the connected mode is transmitted, whether to bar the transmission is determined.

The determination on whether to bar the transmission is performed at step S1035 based on the mapping information stored by the UE framework and modem 1002. The UE framework and modem 1002 checks the application ID mapped to the source address and source port in the stored mapping information. The UE framework and modem 1002 determines whether the corresponding application ID is barred in the application barring information included in the SIB broadcast by the eNB 1010.

If the corresponding application ID is barred, the UE framework and modem 1002 notifies the application 1001 of rejection at step S1040. Otherwise if the application ID is not barred, the UE framework and mode 1002 sends the network a service request to transition to the connected mode at step S1050.

Figure 11:
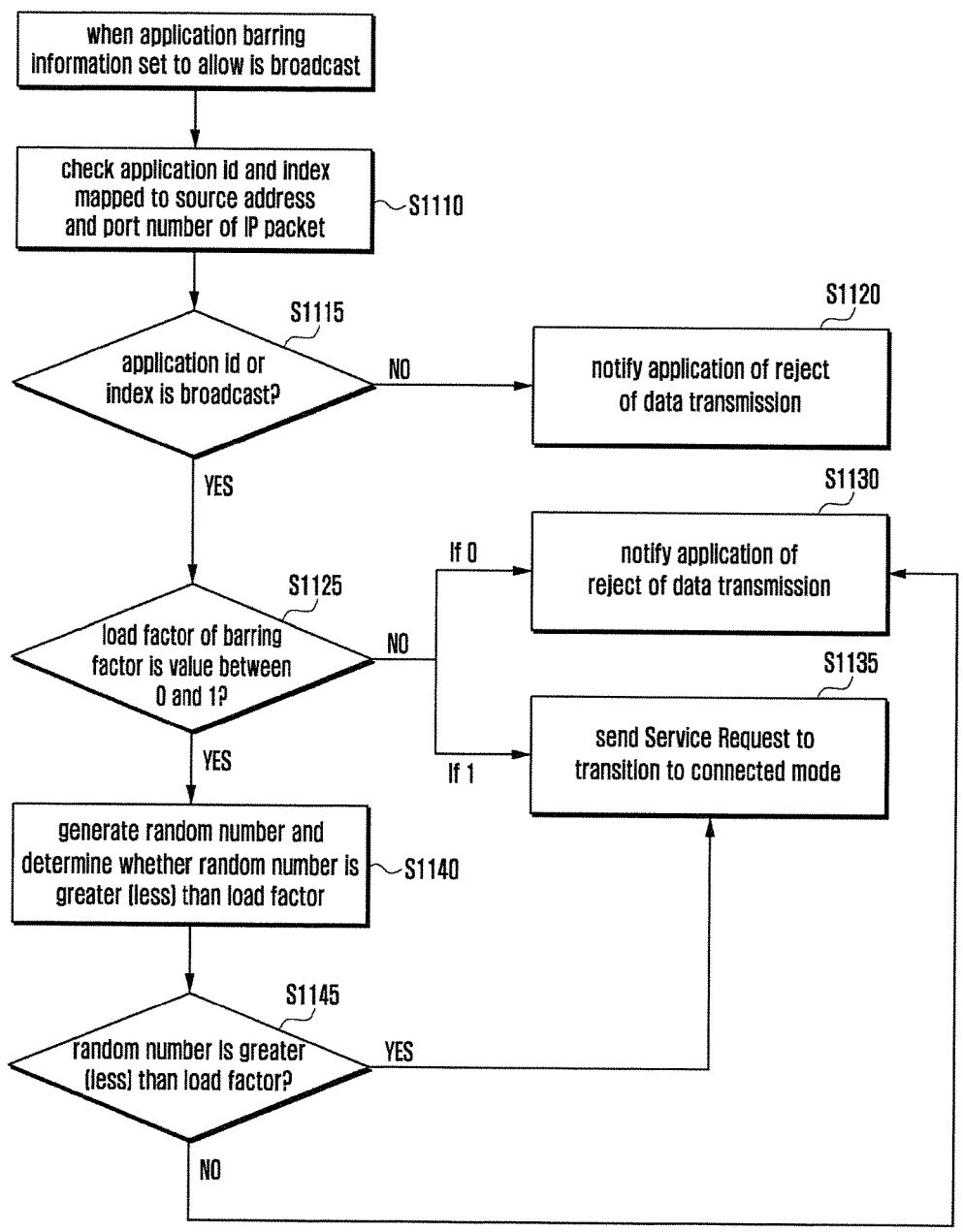
FIG. 11 is a flowchart illustrating a procedure of determining of barring or not when the application barring information set to 'allowed' is broadcast by the eNB 101.

The procedure of determining of barring or not at the UE framework and modem 1002 at step S1035 of FIG. 10 is described in detail with reference to FIGS. 11 and 12. FIG. 11 is a flowchart illustrating a procedure of determining of barring or not when the application barring information set to 'allowed' is broadcast by the eNB 101.

The UE framework and modem 1002 checks the application ID and index mapped to the source address and port number of the IP packet received from the application 1001 at step S1110. Next, the UE framework and modem 1002 determines whether the application ID or index is broadcast by the eNB at step S1115.

As shown in FIG. 10, if the application barring information is defined to be broadcast as set to 'allowed' but the not broadcast by the eNB, the UE framework and modem 1002 sends the application 1001 a message rejecting the data transmission at step S1120.

In the flowchart of FIG. 10, otherwise, if the application barring information is defined to be broadcast as set to 'allowed' and if the barring information is broadcast by the eNB, the UE framework and modem 1002 determines whether the load factor of the barring factor is a value between 0 and 1 at step S1125. In the case that the load factor is not a value between 0 and 1, if the load factor is 0, the UE framework and modem 1002 sends the application 1001 a message rejecting data transmission at step S1130. Otherwise if the load factor is 1, the UE framework and modem 1002 sends the network a service request for transition to the connected mode at step S1135.

In the case that the load factor is a value between 0 and 1, the UE framework and modem 1002 generates a random number and compares the random number and the load factor in size at step S1140. If the random number is greater than the load factor, the UE framework and modem 1002 sends the network a service request for transitioning to the connected mode at step S1145. Otherwise if the random number is less than the load factor, the UE framework and modem 1002 sends the application 1001 a message rejecting the data transmission at step S1130.

Summarizing the embodiment of FIG. 11, the application ID of the application to execute is not carried in the SIB of the eNB, the UE regards the application as a barring target and applies the barring factor. When applying the load factor as barring factor, the UE sends the eNB a value between 0 and 1 as the load factor, generates a random number between 0 and 1 and, if the random number is greater (or less) than the number broadcast by the eNB, regards that the application has passed the barring to transmit a connection request. If it fails to pass the barring, i.e. if barred, the UE framework and modem notifies the application 1001 that the data transmission is rejected.

Figure 12:
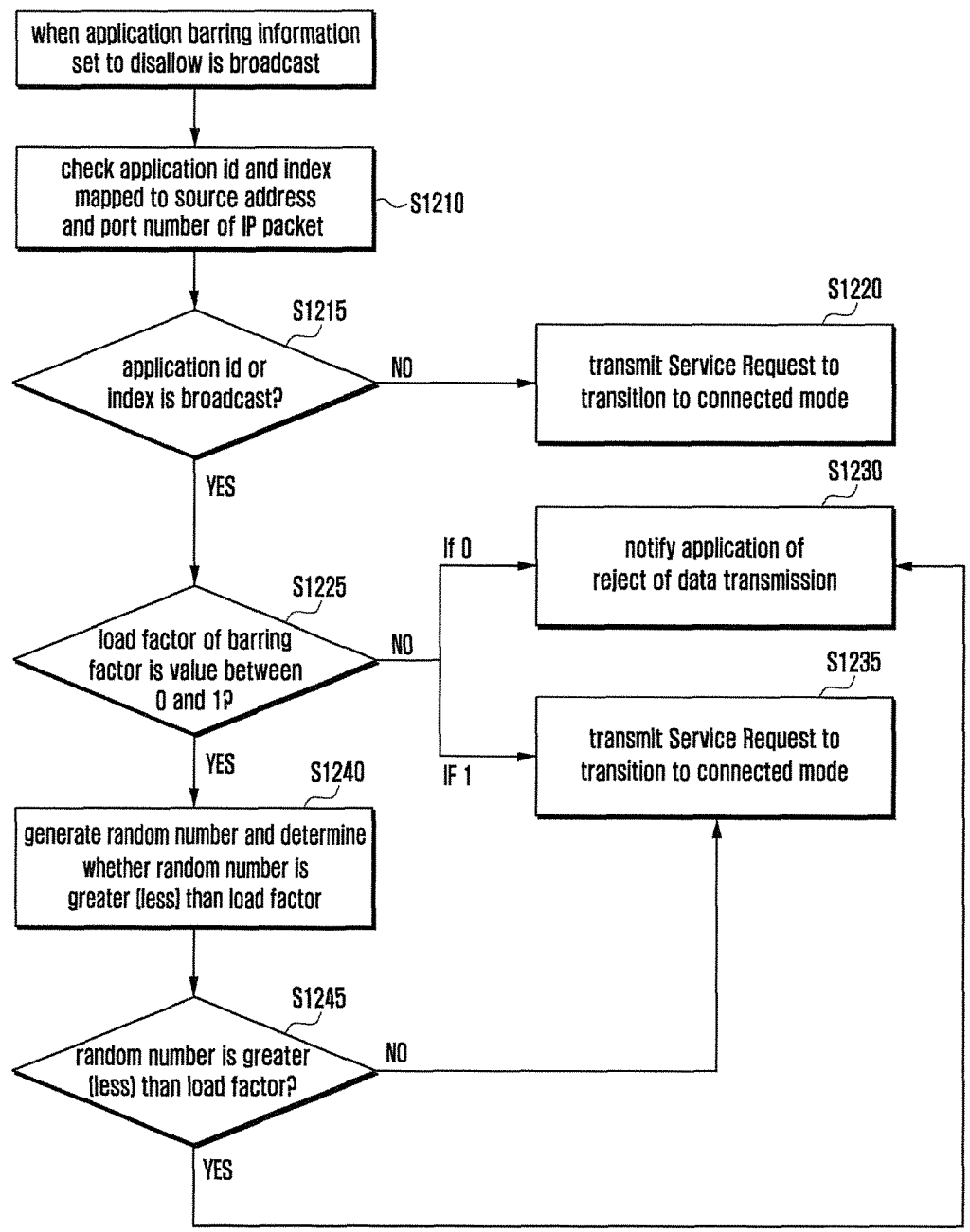
FIG. 12 is a flowchart illustrating a procedure of barring or not when the application barring information set to 'disallowed' is broadcast through SIB.

FIG. 12 is a flowchart illustrating a procedure of barring or not when the application barring information set to 'disallowed' is broadcast through SIB. That is, if the barring information is not broadcast, it is determined that the target is not barred and, if broadcast, determines whether to apply the barring.

The UE framework and modem 1002 checks the application ID and index mapped to the source address and port number of the IP packet received from the application 1001 at step S1210. Next, the UE framework and modem 1002 determines whether the application ID or index is broadcast by the eNB at step S1215.

If the application ID or index is not broadcast, the UE framework and mode 1002 sends the network a service request for transitioning to the connected mode at step S1220.

If the application ID or index is broadcast, the UE framework and modem 1002 determines whether the load factor of the barring factor is a value between 0 and 1. In the case that the load factor is not a value between 0 and 1, if the load factor is 1, the UE framework and modem 1002 sends the application 1001 a message rejecting data transmission at step S2130. Otherwise if the load factor is 0, the UE framework and modem 1002 sends the network a service request for transition to the connected mode at step S1235.

In the case that the load factor is a value between 0 and 1, the UE framework and modem 1002 generates a random number and compares the random number and the load factor in size at step S1240. If the random number is less than the load factor, the UE framework and modem 1002 sends the network a service request for transitioning to the connected mode at step S1245. Otherwise if the random number is greater than the load factor, the UE framework and modem 1002 sends the application 1001 a message rejecting the data transmission at step S1230.

The solution 1 is simple because of using OMA-DM and has three characteristics as follows.

1) Since only the home operator can apply the UE configuration using OMA-DM due to the authentication and OMA-DM server configuration problem, it is necessary for the UE to store the application name and ID configuration lists used by the roaming partners per roaming partner for roaming and, if a list is updated by the corresponding roaming partner, update the corresponding list.

2) The information amount to be broadcast increases in proportion to the number of application to which the barring information identical in size with the application ID.

Ex) If the application ID is 32-bit long, the broadcast information amount becomes application ID size (32 bits)× number of applications (application_num)+barring information size (barring-info-size) according to the number of the application to which the same barring information is applied.

3) All the operators have to use the same application names Although different application IDs can be used, but the application names have to be identical each other.

2) Solution 2: Method of Using Application Index

The second characteristic of solution 1 is can be solved in such a way of configuring the application index value, instead of the application ID, to the UE and broadcasting a map (e.g. bitmap) in which the xth bit of the index is marked so as to reduce the information amount.

Figure 13:
FIG. 13 is a diagram illustrating an exemplary application map broadcast by the operator through an eNB.
Figure 14:
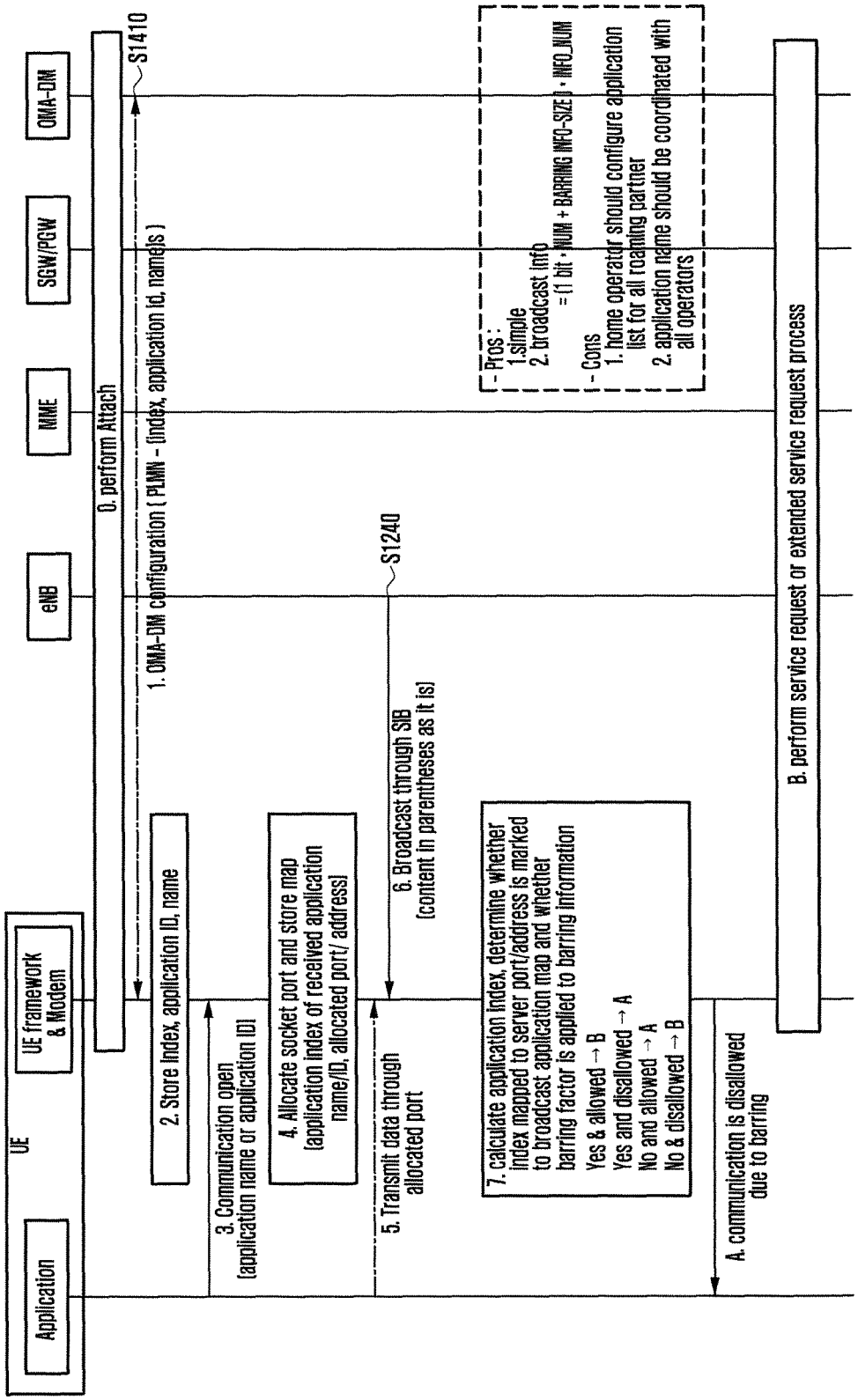
FIG. 14 is a signal flow diagram illustrating a procedure of barring the executions of the applications installed in the UE discriminately using application IDs according to solution 2.

A description is made of solution 2 with reference to FIGS. 13 and 14.

FIG. 13 is a diagram illustrating an exemplary application map broadcast by the operator through an eNB.

FIG. 14 is a signal flow diagram illustrating a procedure of barring the executions of the applications installed in the UE discriminately using application IDs according to solution 2.

The operator configures the application index, application name, and application ID to the UE using OMA-DM at step S1410. In the case of the format of (application index, application name, application ID), it can be configured in such a way of (1, KakaoTalk, 112345) and (6, skype, 1234234).

Then the operator broadcasts the SIB including the application map formatted as shown in FIG. 13. In the application map depicted in FIG. 13, the first and sixth bits are marked such that the UE determines the corresponding applications as the barring targets.

The barring procedure of using the application index as shown in the signal flow diagram of FIG. 14 is identical in order with that of FIG. 12 with the exception that the information configured through the OMA-DM at step S1410 includes the application index and the barring target is determined based on the marking made in the application map other than the presence of the application ID. Thus, detailed description on FIG. 14 is omitted herein. The second solution is capable of solving the characteristic 2 of solution 1 by reducing the broadcast information amount.

3) Solution 3: Method of Using VPLMN Signaling

Solutions 1 and 2 use OMA-DM such that the home operator has to configure even the information of the list to be used in all the roaming partners. In order to solve this problem, solution 3 proposes a method for the roaming partner to provide the list directly through PCO signaling as shown in FIG. 15.

Figure 15:
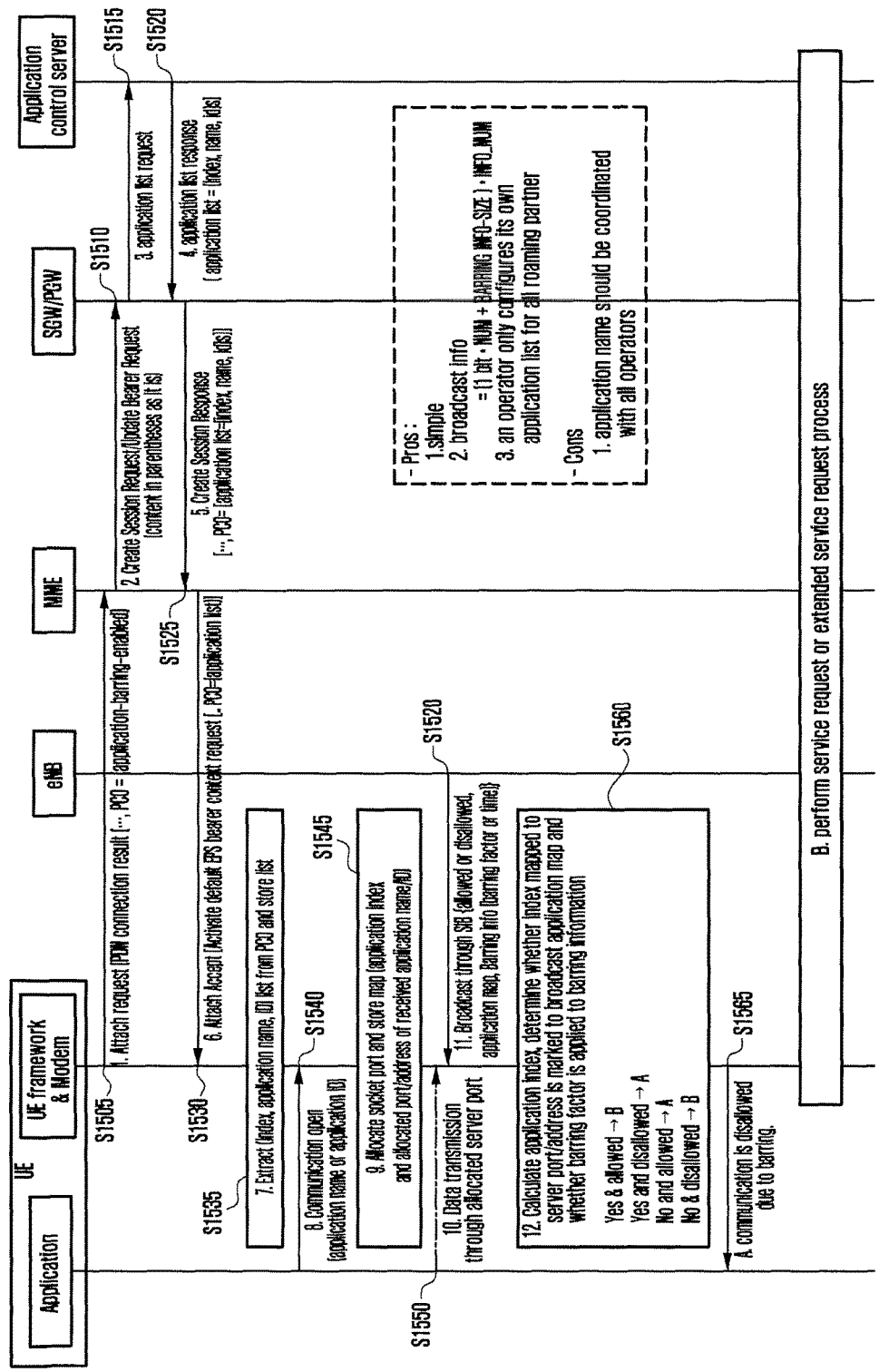
FIG. 15 is a signal flow diagram illustrating a procedure of barring the executions of the applications installed in the UE discriminately according to solution 3 of the second embodiment of the present invention.

FIG. 15 is a signal flow diagram illustrating a procedure of barring the executions of the applications installed in the UE discriminately according to solution 3 of the second embodiment of the present invention.

Descriptions are made of the respective steps of FIG. 15 hereinafter.

S1505: The UE sends the MME an attach request message including a PDN connection request message for establishing a default PDN connection as an ESM message. Here, the PDN connection request message includes a Protocol Configuration Option (PCO) set to 'application barring enabled.'

S1510: Upon receipt of the attach request message, the MME sends the SGW/PGW a Create Session Request message for establishing the default PDN connection, the Create Session Request message including the PCO value as received from the UE.

S1515, S1520: If the application barring enabled is configured, the PGW sends an application control server an application list request message to acquire the application list including the application index, application ID, and application name. In the case of using the application list configured in the PGW, steps S1515 and 1520 are omitted.

S1525: The PGW sends the MME a Create Session Response message including the PCO set to the application list.

S1530: If the PCO set to the application list is received from the PGW, the MME sends the UE an Attach Accept message including the application list. In detail, the MME copies the application list to the PCO in the Activate Default EPS Bearer Context Request message to be transmitted to the UE and includes this message in the Attach Accept message. S1535: Upon receipt of the application list from the MME through PCO, the UE stores the application list for use afterward. The stored application list is handled in valid in the registered PLMN representing the currently registered operator network and its equivalent PLMN. Then the rest part of the attach procedure progresses.

S1540: The application of the UE sends the UE framework and modem (OS/service Framework) the application name as one of the parameters to request for communication service open for data transmission.

S1545: Upon receipt of the application execution request, the UE framework and modern (OS/service framework) allocates a source port, retrieves the application index and application ID from the application list received at step S1530 based on the application name received from the application, maps the application index and ID to the allocated port number, and stores the mapping relationship.

S1550: The UE transmits the data through the port allocated to the application.

S1555: Meanwhile, the eNB broadcasts the SIB including the application barring information set to allowed or disallowed and application map information.

S1560: If the IP data is received, the UE framework and modem (OS/service framework determines whether the application ID or application index mapped to the source address and port of the IP data is barred based on the SIB broadcast by the eNB. The determination is made as described with reference to any of FIGS. 11 and 12.

S1565: If it is determined that the application is a barring target, the procedure goes to process A to notify the application that the transmission is not allowed.

Otherwise if it is determined that the application is not a barring target, the procedure goes to process B to send the network a service request for transitioning to the connected mode for data transmission.

The method in the UE notifies the network that the application barring is enabled (application-barring-enabled) through PCO and the network sends the UE the application list as shown in FIG. 15 may be applicable for all the messages capable of being transmitted through PCO.

In FIG. 15, it is assumed that the MME of the roaming network uses the PGW of the roaming network when configuring the application list using the PCO.

If the MME of the roaming network cannot use the PGW of the roaming network but the PGW of the home network, the MME checks that the received PCO is set to application-barring-enabled and stores the corresponding value, the application-barring-enabled value being erased when the Create Session Request/Update Bearer Request message is transmitted to the SGW/PGW at step S1510.

Afterward, when transmitting the Attach Accept/TAU Accept message to the UE after the receipt of the Create Session Response/Update Bearer Response message at step S1525, the MME modifies the PCO content by setting the PCO to 'application list' and sends the UE the application list of the roaming network.

Like the solution 2, the solution 3 uses the application index to reduce the information amount to be broadcast while allowing the home operator to do not configure the information of the roaming partner while 4) Solution 4: Method of Using Packet Filter The solutions 1, 2, and 3 are on the assumption that the operators use the same application name. In order to overcome the situation of using different application names, the solution 4 proposes a method of using a packet filter.

The network transmits an Activate Default EPS Bearer Context Request along with the Attach Accept message when establishing the default bearer in the attach procedure of the UE and, at this time, designates an application using the packet filter. That is, the network configures the application index or application ID value in the packet filter identified by a source address, a source port, a receiver address, and a receiver port corresponding to the application traffic such that the UE stores such information.

An exemplary packet filter format is depicted in FIG. 16. As shown in FIG. 16, the packet filter proposed in the present invention includes the information such as application index or application ID.

The application analyzes the IP header of the data which is configured in the UE to retrieve a matched filter and then extract the application index or application ID configured in the filter when attempting data transmission. Afterward, the UE checks the broadcast information to determine whether the application is a baring target.

Figure 17:
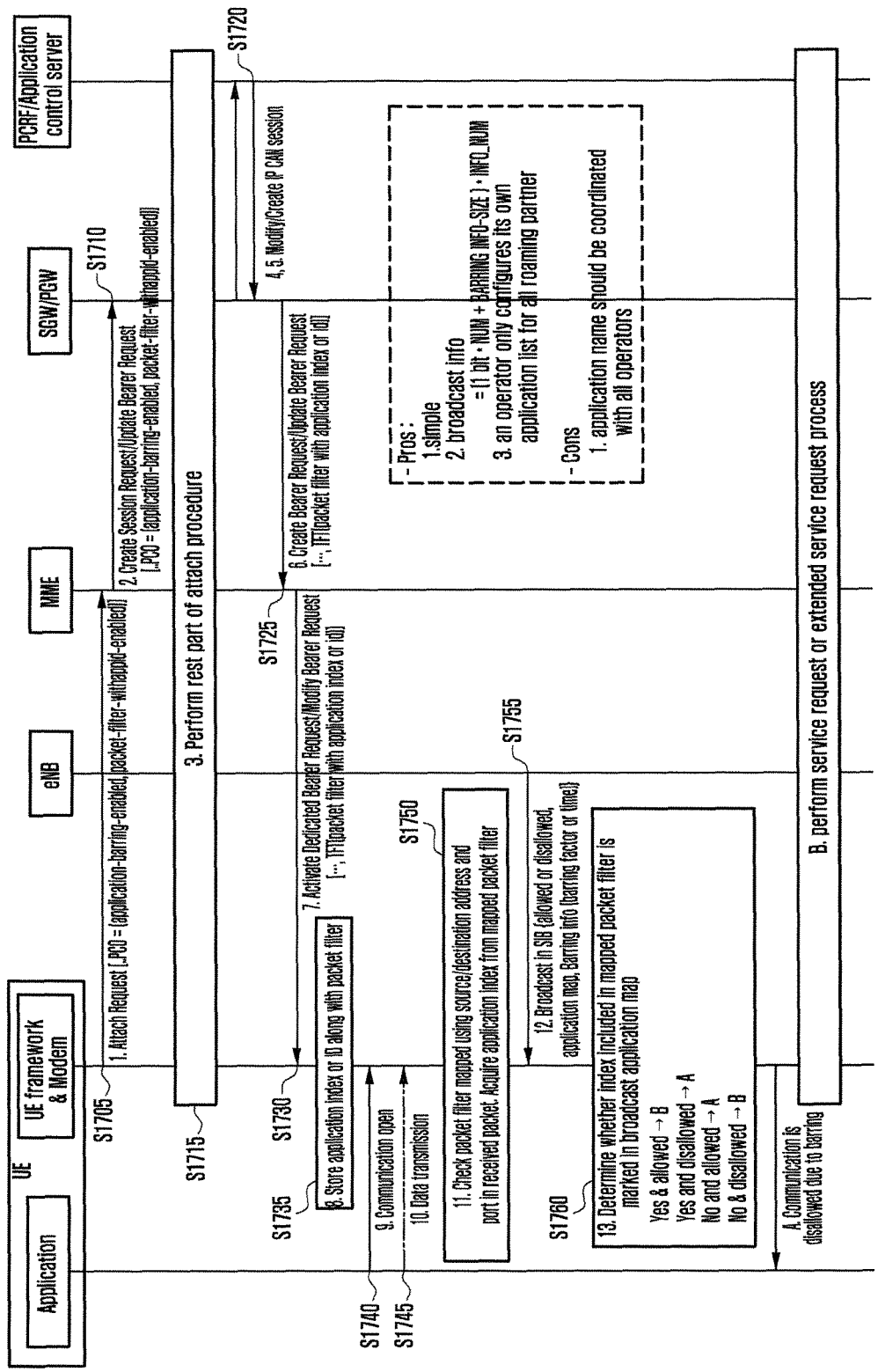
FIG. 17 is a signal flow diagram illustrating the procedure of solution 4 according to the second embodiment of the present invention.

A description thereof is made with reference to FIG. 17.

FIG. 17 is a signal flow diagram illustrating the procedure of solution 4 according to the second embodiment of the present invention.

S1705: The UE sends the MME an Attach Request message Including PCO containing an application barring applicability indicator and a packet filter analysis capability indicator indicating the capability of analyzing a packet filter containing an application ID or application index.

S1710, S1715: The MME sends the SGW/PGW the PCO information received from the UE using a Create Session Request message. Then the PGW saves the PCO information of the UE and performs the attach procedure.

S1720: After the attach procedure, the PGW acquires the information on the packet filter from the PCRF using the IP CAN session modification/creation. At this time, the PGW request the PCRF for the application list, and the PCRF sends the PGW a response message including the application list. In the case of using the application list stored in the PGW, step S1720 may be omitted.

S1725: The PGW configures the packet filter including the application index or application id in the field following the packet filter content of the packet filter information formatted as shown in FIG. 16. The PGW sends the MME the packet filter through the Create Bearer Request message or the Update Bearer Request message.

S1730: The MME sends the UE the information received from the PGW through a Modify Bearer Request message or an Activate Dedicated Bearer Request message.

S1735: The UE stores the packet filter including the application index or application ID which is received from the MME.

S1740, S1745: The UE requests for opening the communication service and then transmits the data.

S1750: The UE framework and modem (service framework/OS) checks the matched packet filter based on the address and port information of the IP packet transmitted by the application and retrieves the application ID or application index included in the corresponding packet filter. S1755: Meanwhile, the UE acquires the application barring information from the SIB broadcast by the eNB.

S1760: The UE determines whether the application index or application ID corresponding to the transmitted data is barred through the procedure of one of FIGS. 11 and 12. If the application index or ID is barred, the UE notifies the application that the communication is rejected through process A. Otherwise if the application index or ID is not barred, the UE sends the network the Attach Request message for transitioning to the connected mode through process B.

Third Embodiment

A description is made of the third embodiment of the procedure for the operator to notify the UE of the application of the Operator Determined Barring.

Currently, a Call Barring service for the user to bar a certain call is defined for use in IMS network. There are Barring of all incoming, Barring of all outgoing call, Barring of outgoing international call, and Barring of incoming call when roaming that are applied selectively when requested by the user. However, there may be a case in that the operators want to apply a certain barring service for a certain user arbitrarily to protect their profit. For example, it may be necessary for the operator to barring the outgoing or incoming call for a user who does not pay the communication fee.

In the conventional technology, however, any method for notifying the user of the call barring applied according to the operator's determination and clearing the session attempted by the UE is not specified.

Figure 18:
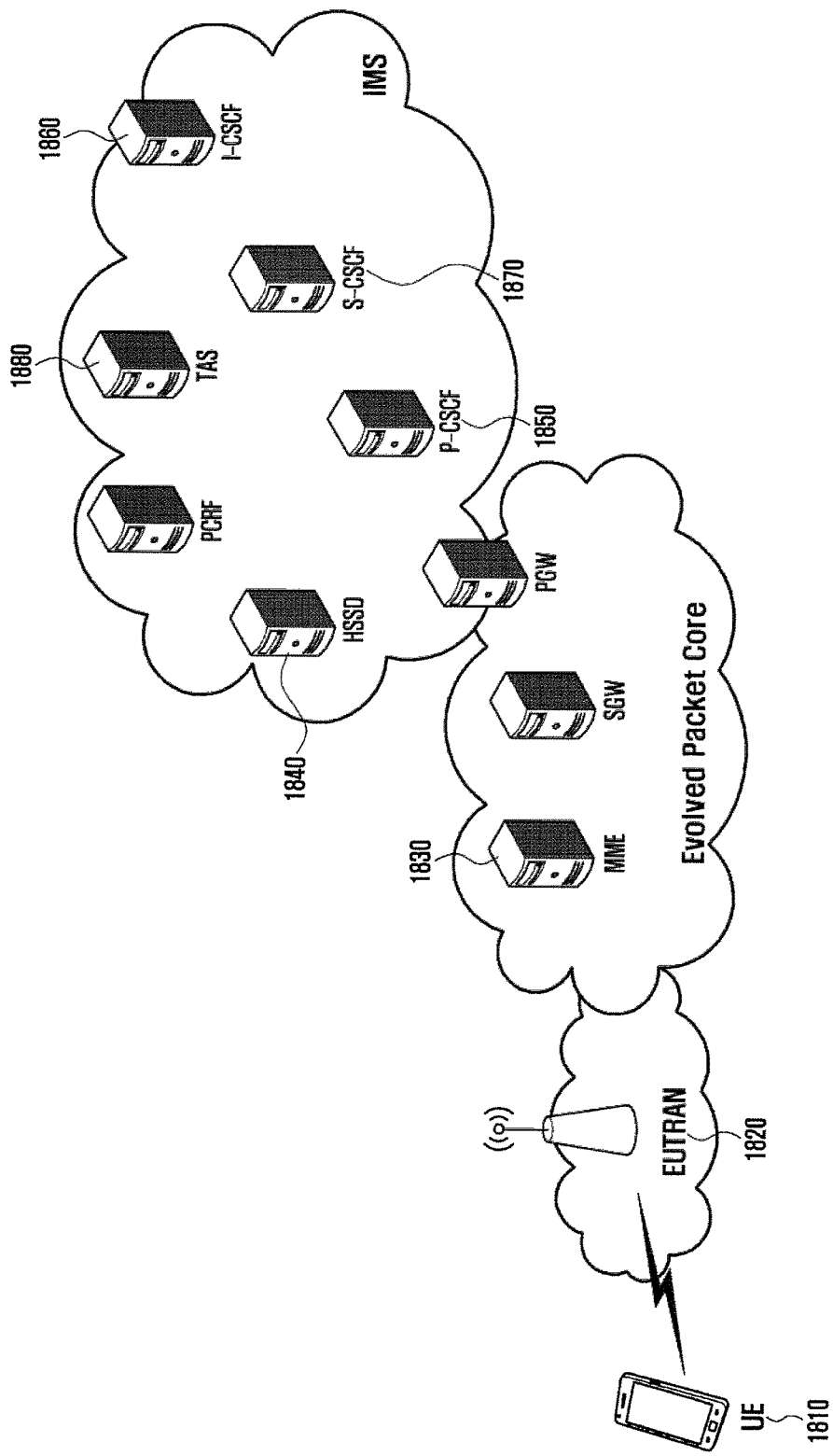
FIG. 18 is a schematic diagram illustrating EPS and IMS networks as basis of an embodiment of the present invention.

FIG. 18 is a schematic diagram illustrating EPS and IMS networks as basis of an embodiment of the present invention. Descriptions are made briefly of the entities related to the present invention among the entities depicted in FIG. 18 hereinafter.

Referring to FIG. 18, the User Equipment (UE) 1810 is a mobile terminal, and the eNB (E-UTRAN in the drawing) 1820 is an entity which controls radio resource and is connected with the UE 1820 through a radio channel.

The Mobility Management Entity (MME) 1830 is responsible for managing the mobility of the UE 1810 in the idle mode and Roaming and Authentication of the UE. The MME 1830 also processes the bearer signal generated by the UE 1810.

The Home Subscriber Server (HSS) 1840 stores the subscriber information of each UE and provides the MME 1830 with the UE information, when the UE 1810 accesses the network, for use at the MME 1830 in controlling the UE 1810. The MME 1830 also stores the service profiles of the services provided by the IMS network, which are to the UE 1810.

The Session Control Function (CSCF) of the IMS network includes a P-CSCF 1850, an I-CSCF 1860, and an S-CSCF 1870. The P-CSCF 1850 denotes the Proxy CSCF, and the S-CSCF 1870 denotes the Serving CSCF responsible for IMS session control and service control.

The TAS 1880 denotes the Telephony Application Server responsible for providing supplementary service of the IMS call.

Figure 19:
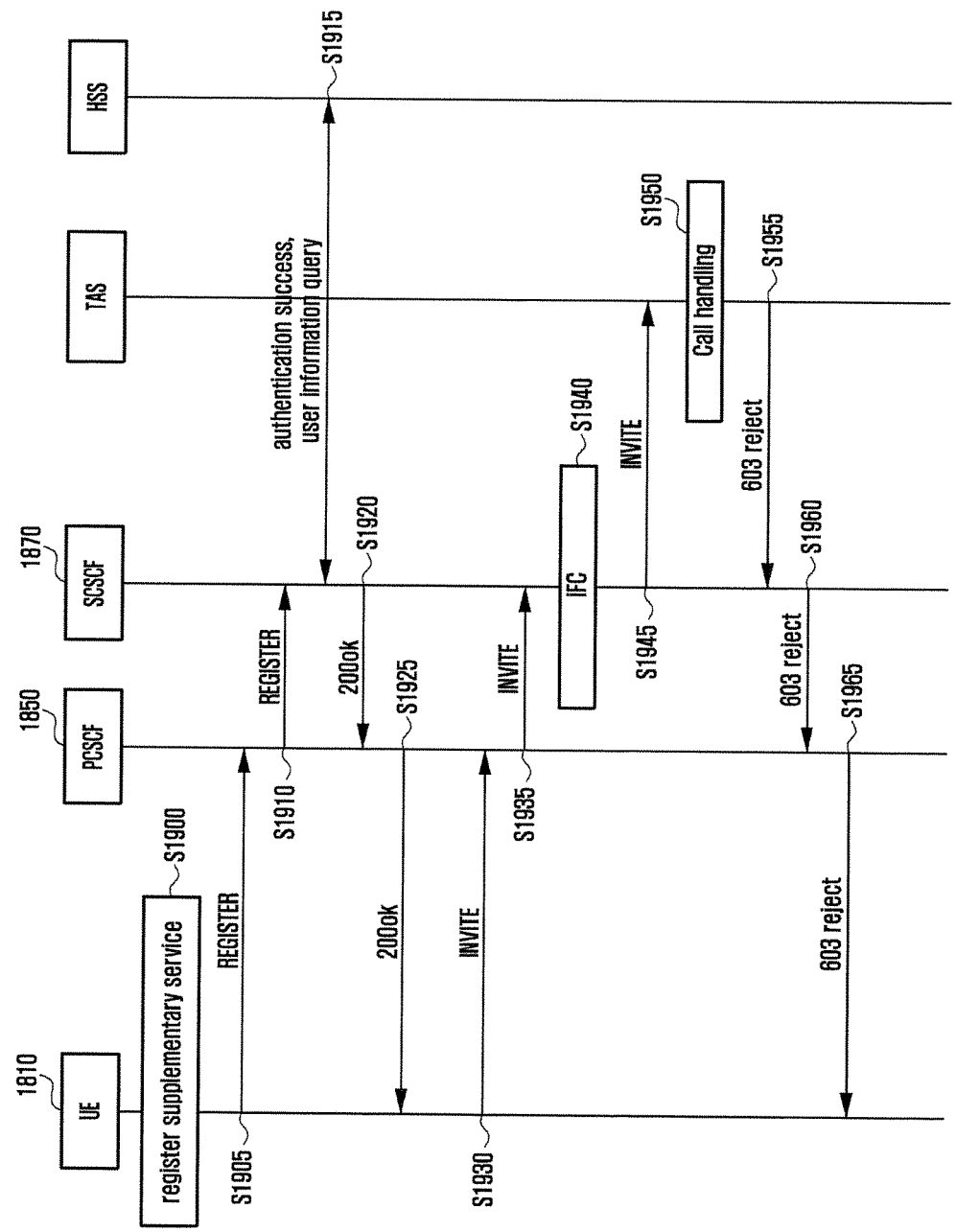
FIG. 19 is a signal flow diagram illustrating a 'Barring of all outgoing call' operation defined for an IMS network.

The barring of all outgoing call operation specified for the current IMS network based on the above-described network structure can be depicted as shown in FIG. 19.

The user registers a supplementary service to bar placing an outgoing call with the UE 1810 at step S1900. For the registration of the supplementary service, the UE 1810 connects to a server of the operator or a service provider to register the barring of all outgoing call service. Then the supplementary service information registered by the UE 1810 is shared with the TAS 1880, which identifies the outgoing call of the corresponding UE 1810 as a barred call.

Afterward, the UE 1810 sends the P-CSCF a REGISTER message for registration with the IMS network at step S1905. Then the PCSCF forwards the REGISTER message to the SCSCF at step S1940.

The SCSCF 1870 downloads the service profile of the corresponding UE 1801 from the HSS 1840 at step S1915. The service profile includes the initial Filter Criteria (iFC). The SCSCF 1870 sends the PCSCF 1850 a 200OK message at step S1920. Then the PCSCF 1850 forwards the 200OK message to the UE 1810 to reply in response to the REGISTER request.

In this way, the UE 1810 completes the procedure of registration with the IMS network.

Afterward, the UE 1810 sends the PDSCF 1850 an INVITE message to initiate the IMS session at step S1930. Then the PCSCF 1850 forwards the INVITE message to the SCSCF 1870 at step S1935.

The SCSCF 1870 checks the iFC of the UE 1810 at step S1940. According to iFC, the INVITE message transmitted by the UE 1810 is supposed to be transmitted to the TAS 1880. Accordingly, the SCSCF 1870 forwards the INVITE message to the TAS 1880 according to the iFC at step S1945.

The TAS 1880 checks that the outgoing call of the UE 1810 is barred and rejects the session request at step S1950. Then the TAS 1880 sends the UE a session reject message (603 Declined) at step S1955.

Figure 20:
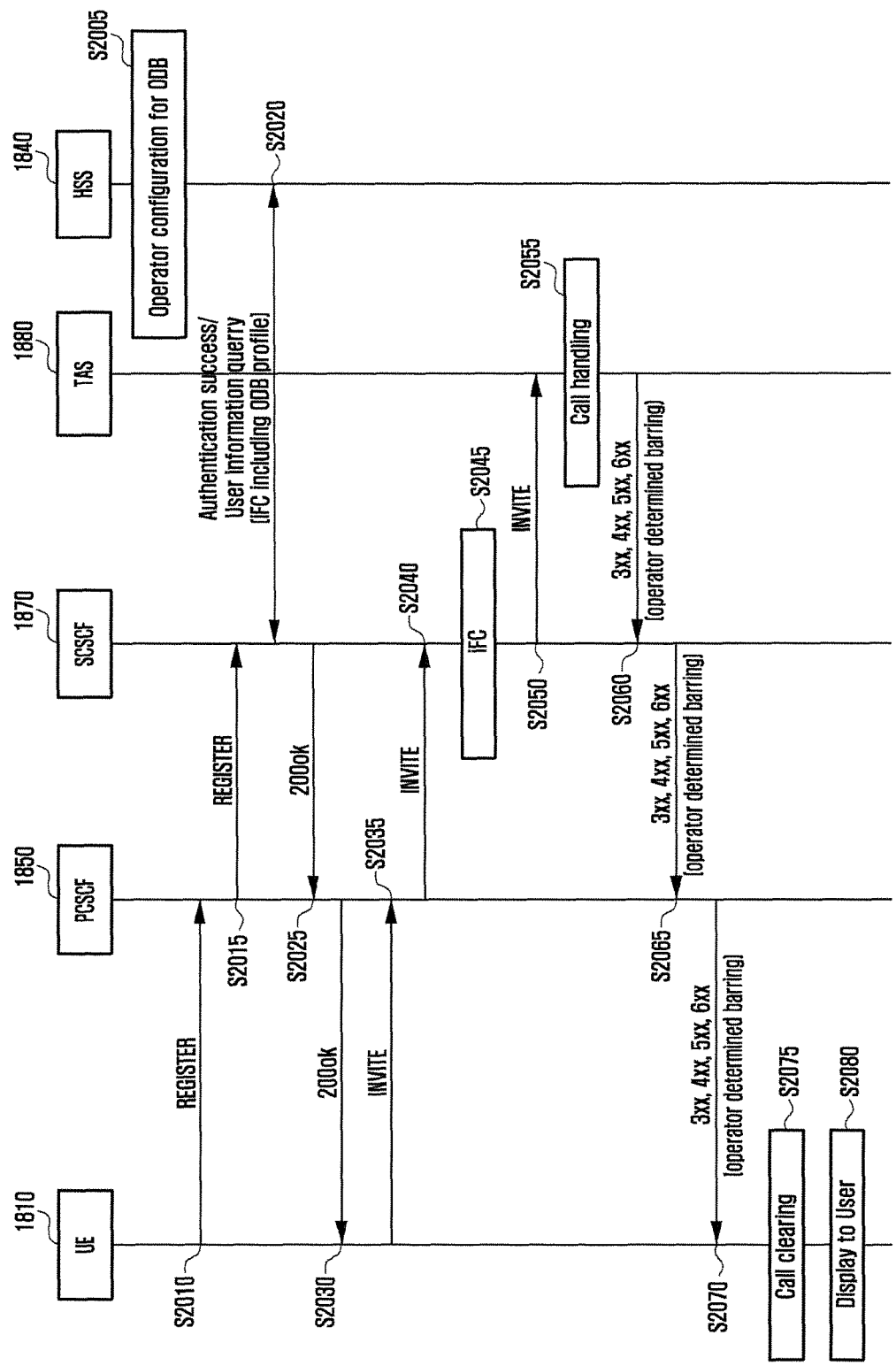
FIG. 20 is a signal flow diagram illustrating a procedure for the UE 1810 to register with the IMS network and abiding by the ODB according to an embodiment of the present invention.

FIG. 20 is a signal flow diagram illustrating a procedure for the UE 1810 to register with the IMS network and abiding by the ODB according to an embodiment of the present invention.

Summarizing the above embodiment of the present invention, the UE 1810 to which ODB is applied receives a response message including an indicator indicating the session rejection from the TAS 1880. If the response message includes an action to be taken by the UE, the UE 1810 takes the action as instructed. A description is made of the ODP application procedure in detail with reference to FIG. 20.

The operator or the service provider applies the Operator Determined Barring (ODB) to the UE 1810 and registers the UE-related context at step S2005.

Afterward, the UE 1810 sends the PCSCF 1850 a REGISTER message for performing registration procedure with the IMS network at step S2010. Then the PCSCF 1850 forwards the REGISTER message to the SCSCF 1870 at step S2015.

Afterward, the SCSCF 1870 downloads the service profile of the UE 1810 from the HSS 1840. The service profile includes the initial Filter Criteria (iFC). According to an embodiment of the present invention, the iFC includes the context for applying ODB.

The SCSCF 1870 sends the PCSCF 1850 a 200OK message at step S2025, and the PCSCF 1850 forwards the 200OK message to the UE 1810.

The UE sends the PCSCF 1850 an INVITE message to initiate the IMS session at step S2035. Then the PCSCF 1850 forwards the INVITE message to the SCSCF 1870 at step S2040.

The SCSCF 1870 checks the iFC of the UE 1810 at step S2045. According to iFC, the INVITE message transmitted by the UE 1810 is supposed to be transmitted to the TAS 1880. Accordingly, the SCSCF 1870 forwards the INVITE message to the TAS 1880 according to the iFC at step S2050.

The TAS 1880 processes the corresponding session according to the information in the ODB context. The TAS 1880 may send the UE 1810 the response in the form of 3xx, 4xx, 5xx, and 6xx as shown in the steps subsequent to S2060 and transfer the session to another recipient. The embodiment of FIG. 20 is directed to the procedure of transmitting the response to the UE 1810.

The TAS 1880 sends the SCSCF 1870 the response message in reply to the INVITE message of the UE 1810. In this case, the response message includes the indicator informing that the session request is rejected due to the ODB.

An embodiment of the present invention proposes an 'operator determined barring' indicator as an example. This indicator may be included in the header of the SIP message or in the form of a feature tag. Also, the indicator may be included in the SIP response message in a XML format.

Then the SCSCF 1870 sends the PCSCF 1850 the response message, and the PCSCF 1850 forwards the response message to the UE 1810.

The UE 1810 receives the response message and checks the 'operator determined barring' indicator included in the response message. The UE 1810 may check that its session request is rejected by the ODB.

The UE 1810 also determines whether a Required_action is included in the response message. The information on the required action may be included in the response message optionally. If the Required_action included in the response message instruct to close the requested session, the UE 1810 ends the session. If the required_action is not included, the UE may take a default action. The default action may be preconfigured in the UE or updated by the operator through the OMA-DM.

FIG. 21 is a diagram illustrating an exemplary response message proposed in an embodiment of the present invention.

As shown in FIG. 21, the response message may include the operator determined barring indicating that the session request is rejected and the required_action information.

FIG. 22 is a diagram illustrating an exemplary UE context transmitted from the HSS to the TAS according to an embodiment of the present invention. The UE context is applied to step 2005 of FIG. 20.

The data reference is an arbitrary number.

The XML tag is the xml tag used in the data and, an embodiment of the present invention proposes IMS_ODB.

The Access key is a reference identity such as IMS public user identity or MSISDN for access to the data and applicable to Sh-Pull, Sh-Update, and Sh-Subs-Notif messages.

FIG. 23 is a diagram illustrating an exemplary XML schema used for implementing ODB according to an embodiment of the present invention.

Figure 24:
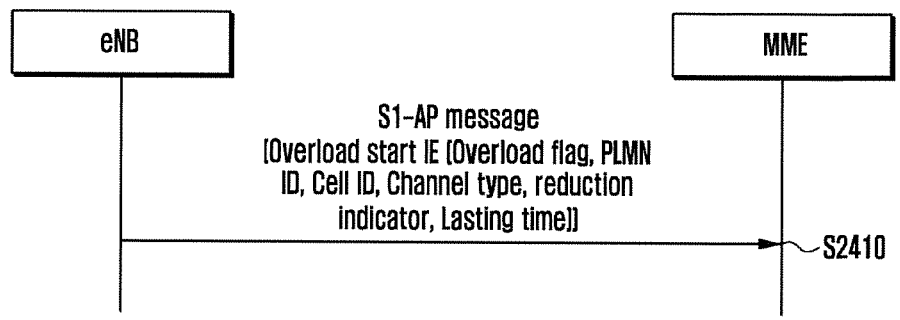
FIGS. 24 and 25 are signal flow diagrams illustrating a procedure for the eNB to notify the MME of the occurrence or resolution of congestion on a specific channel according to an embodiment of the present invention.
Figure 25:
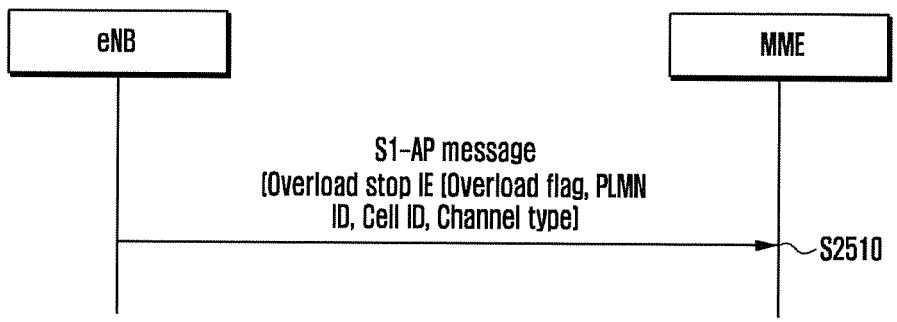

FIGS. 24 and 25 are signal flow diagrams illustrating a procedure for the eNB to notify the MME of the occurrence or resolution of congestion on a specific channel according to an embodiment of the present invention.

Conceptually, the eNB may notify the MME of its congestion status using a certain control message (e.g. S1-AP message) as shown at step S2410 or S2510. That is, the congestion information of the eNB may be piggybacked on a message transmitted to the MME for other purpose (e.g., Initial Context Setup Response). The congestion information piggybacked on a certain S1-AP message may include congestion presence/absence, congestion target (cell, PLMN, channel, etc.), congestion continuation time, congestion level, and load level required to resolve the congestion.

This embodiment is directed to an example of the congestion on the paging channel. In FIG. 24, if the paging channel is congested, the eNB sends the MME an S1-AP message including the overload status information (e.g. Overload Start IE) at step S2410. The overload status information may include just a flag indicating that the overload situation has begun or the information on the congested object, i.e. PLMN ID of the cell, cell ID, congested channel (paging channel in this embodiment), congestion degree, load level required to resolve the congestion, and congestion continuation time.

If the information on the start of the overload is received from the eNB, the MME regards that a specific PLMN, a specific cell, or a specific channel is congested according to the information included in the status information since then and, if the congestion continuation time is included in the overload status information, starts a timer to count the expiry of the timer as the end of the congestion. Although the S1-AP message received from the eNB is related to a specific UE, the overload status information included in the corresponding S1-AP message may not be concerned with the specific UE.

As shown in FIG. 25, the MME may receive the overload status information informing that the target (specific PLMN, specific, cell, or specific channel depending on the target information) is not congested any more (e.g. Overload Stop IE) from the eNB at step S2510. Then the MME regards this as the resolution of the congestion status to the target (corresponding cell or corresponding channel of PLMN). If the congestion continuation time is included in the overload status information, the MME regards the expiry of the congestion continuation timer as the resolution of the congestion.

Although the congestion continuation timer is not included in the overload status information, the MME may starts a timer according to its internal time to count the running duration of the timer as the continuation of the congestion.

Although the eNB may use different IEs to notify of the start and end of the overload status as shown in FIGS. 24 and 25, it is also possible to notify of those by inserting the Overload Status IE into a certain control message (e.g. S1-AP message).

In this case, the eNB may notify of the overload status using the overload flag of the overload status information or the congestion level information or the overload level required to resolve the congestion. In this case, the congestion level required to resolve the congestion may be set to 0. The eNB also may set the congestion continuation time of the overload status information to 0 to notify of the resolution of the congestion status.

Each of the nodes of the wireless communication network presented in the drawings and detail description may include a transceiver to transmit and receive signals to and from other nodes and a control unit for controlling the functions of the respective nodes. The detailed functions of the control unit of each node have been described in the above embodiments, detailed descriptions thereof are omitted herein.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a gateway in a wireless communication system, the method comprising:
   receiving a downlink packet from a core network node;
   determining whether the downlink packet is associated with an internet protocol (IP) packet data network (PDN) connection;
   identifying paging policy information included in the downlink packet if the downlink packet is associated with the IP PDN connection, wherein the paging policy information is associated with a specific service corresponding to a quality of service class identifier (QCI) 5;
   generating a downlink data notification message including the paging policy information; and
   transmitting the downlink data notification message including the paging policy information to a mobility management entity (MME).

2. The method of claim 1, wherein the specific service includes an internet protocol multimedia subsystem (IMS) call service.

3. The method of claim 1, wherein the paging policy information is used to determine at least one of a frequency, a coverage, and a priority of a paging by the MME.

4. The method of claim 1, wherein the paging policy information is included in a service class identity field of the downlink data notification message, and
   wherein the downlink packet includes general packet radio service tunneling protocol user plane (GTP-U) packet.

5. A method by a mobility management entity (MME) in a wireless communication system, the method comprising:
   receiving a downlink data notification message from a gateway;
   identifying whether the downlink data notification message includes paging policy information; and
   performing a paging based on the paging policy information if the downlink data notification message includes the paging policy information,
   wherein the paging policy information is included in the downlink data notification message if a downlink packet, transmitted from a core network node to the gateway, is associated with an internet protocol (IP) packet data network (PDN) connection, wherein the paging policy information included in the downlink data notification message is identical to the paging policy information included in the downlink packet, and wherein the paging policy information is associated with a specific service corresponding to a quality of service class identifier (QCI) 5.

6. The method of claim 5, wherein the paging policy information is used to determine at least one of a frequency, a coverage, or a priority of the paging.

7. The method of claim 5, wherein performing the paging further comprising:

determining whether a quality of service class identifier (QCI) of an evolved packet system (EPS) bearer for the downlink data notification message corresponds to a predetermined value; and performing the paging based on the paging policy information if the QCI corresponds to the predetermined value.

8. The method of claim 5, wherein performing the paging further comprising:

determining whether an access point name (APN) of a packet data network (PDN) connection for the downlink data notification message corresponds to a predetermined APN; and performing the paging based on the paging policy information if the APN corresponds to a predetermined APN.

9. A gateway in a wireless communication system, the gateway comprising:

a transceiver configured to transmit and receive signals; and a controller coupled with the transceiver and configured to:

receive a downlink packet from a core network node;

determine whether the downlink packet is associated with an internet protocol (IP) packet data network (PDN) connection;

identify paging policy information included in the downlink packet if the downlink packet is associated with the IP PDN connection, wherein the paging policy information is associated with a specific service corresponding to a quality of service class identifier (QCI) 5;

generate a downlink data notification message including the paging policy information; and transmit the downlink data notification message including the paging policy information to a mobility management entity (MME).

10. The gateway of claim 9, wherein the specific service includes an internet protocol multimedia subsystem (IMS) call service.

11. The gateway of claim 9, wherein the paging policy information is used to determine at least one of a frequency, a coverage, and a priority of a paging.

12. The gateway of claim 9, wherein the paging policy information is included in a service class identity field of the downlink data notification message, and wherein the downlink packet includes general packet radio service tunneling protocol user plane (GTP-U) packet.

13. A mobility management entity (MME) in a wireless communication system, the MME comprising:

a transceiver configured to transmit and receive signals; and a controller coupled with the transceiver and configured to:

receive a downlink data notification message from a gateway;

identify whether the downlink data notification message includes paging policy information; and perform a paging based on the paging policy information if the downlink data notification message includes the paging policy information, wherein the paging policy information is included in the downlink data notification message if a downlink packet, transmitted from a core network node to the gateway, is associated with an internet protocol (IP) packet data network (PDN) connection, wherein the paging policy information included in the downlink data notification message is identical to the paging policy information included in the downlink packet, and wherein the paging policy information is associated with a specific service corresponding to a quality of service class identifier 5.

14. The MME of claim 13, wherein the paging policy information is used to determine at least one of a frequency, a coverage, or a priority of the paging.

15. The MME of claim 13, wherein the controller is further configured to:

control a determination of whether a quality of service class identifier (QCI) of an evolved packet system (EPS) bearer for the downlink data notification message corresponds to a predetermined value; and perform the paging based on the paging policy information if the QCI corresponds to the predetermined value.

16. The MME of claim 13, wherein the controller is further configured to:

control a determination of whether an access point name (APN) of a packet data network (PDN) connection for the downlink data notification message corresponds to a predetermined APN; and perform the paging based on the paging policy information if the APN corresponds to a predetermined APN.

17. The method of claim 1, wherein the paging policy information is used to perform a paging by the MME.

18. The gateway of claim 9, wherein paging policy information is used to perform a paging by the MME.

* * * * *